United States Patent
Ozawa et al.

(10) Patent No.: US 8,879,100 B2
(45) Date of Patent: Nov. 4, 2014

(54) IMAGE FORMING SYSTEM, IMAGE FORMING DEVICE, AND NON-TRANSITORY COMPUTER READABLE MEDIUM FOR UPDATING INFORMATION BASED UPON A USAGE COUNT

(75) Inventors: Kazuaki Ozawa, Tokyo (JP); Makoto Nishimura, Tokyo (JP); Masahiro Oishi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 214 days.

(21) Appl. No.: 13/448,917

(22) Filed: Apr. 17, 2012

(65) Prior Publication Data

US 2013/0107307 A1 May 2, 2013

(30) Foreign Application Priority Data

Oct. 27, 2011 (JP) ................................ 2011-236281

(51) Int. Cl.
- *G06F 3/12* (2006.01)
- *G06K 15/00* (2006.01)
- *H04N 1/00* (2006.01)
- *H04N 1/32* (2006.01)

(52) U.S. Cl.
CPC ........ *H04N 1/00344* (2013.01); *H04N 1/32122* (2013.01); *G06F 3/1267* (2013.01); *H04N 2201/0039* (2013.01); *G06F 3/1222* (2013.01); *G06F 3/1288* (2013.01); *H04N 2201/3274* (2013.01); *H04N 2201/3205* (2013.01); *G06F 3/1239* (2013.01); *H04N 1/00832* (2013.01); *G06F 3/1291* (2013.01); *G06F 3/1273* (2013.01); *H04N 2201/0082* (2013.01)
USPC .......................... 358/1.15; 358/1.13; 358/1.14

(58) Field of Classification Search
CPC ... G06F 3/1222; G06F 3/1239; G06F 3/1273; G06F 3/1288; G06F 3/1267; G06F 3/1291; G06F 21/31; G06F 21/316; G06F 21/34; H04N 1/00344; H04N 1/00832; H04N 1/00323; H04N 1/32122; H04N 2201/0039; H04N 2201/3274; H04N 2201/0082; H04N 2201/0094; H04N 2201/3205
USPC ...................... 358/1.13, 1.14, 1.15; 726/7, 28
See application file for complete search history.

(56) References Cited

U.S. PATENT DOCUMENTS

| | | | |
|---|---|---|---|
| 2006/0250631 A1* | 11/2006 | Igarashi | 358/1.13 |
| 2008/0130047 A1* | 6/2008 | Shudo | 358/1.15 |
| 2008/0244756 A1 | 10/2008 | Kitada | |
| 2009/0260069 A1* | 10/2009 | Nakajima | 726/7 |
| 2010/0149584 A1* | 6/2010 | Cech et al. | 358/1.15 |

FOREIGN PATENT DOCUMENTS

JP A-2008-242851 10/2008

* cited by examiner

*Primary Examiner* — Tammy Pham
*Assistant Examiner* — Walter Yehl
(74) *Attorney, Agent, or Firm* — Oliff PLC

(57) ABSTRACT

An image forming system including plural image forming devices, a first storage unit that stores user information and device information, a transmitting device that transmits image data to an image forming device, a second storage unit that stores the image data, a receiving unit that receives an input of the user information, a first acquiring unit that acquires image data from an image forming device, an image forming unit that forms an image corresponding to the image data, a recording unit that records a use history of the image forming device in the second storage unit, a specifying unit that specifies the image forming device and the user information based on the use history when a use frequency satisfies a predetermined condition, and an updating unit that updates the device information so that the specified image forming device and the specified user information are stored in a correlated manner.

19 Claims, 24 Drawing Sheets

FIG. 3

| USER ID | SPOOLER INFORMATION | | |
|---|---|---|---|
| | 1 | 2 | 3 |
| user001 | spoolerA | spoolerC | - |
| user002 | spoolerB | spoolerC | - |
| ... | ... | ... | ... |

| USER ID | SPOOLER INFORMATION ||
| --- | --- | --- |
|  | 1 | 2 |
| user001 | spoolerA | spoolerC |
| user002 | spoolerB | spoolerC |
| ... | ... | ... |

41a

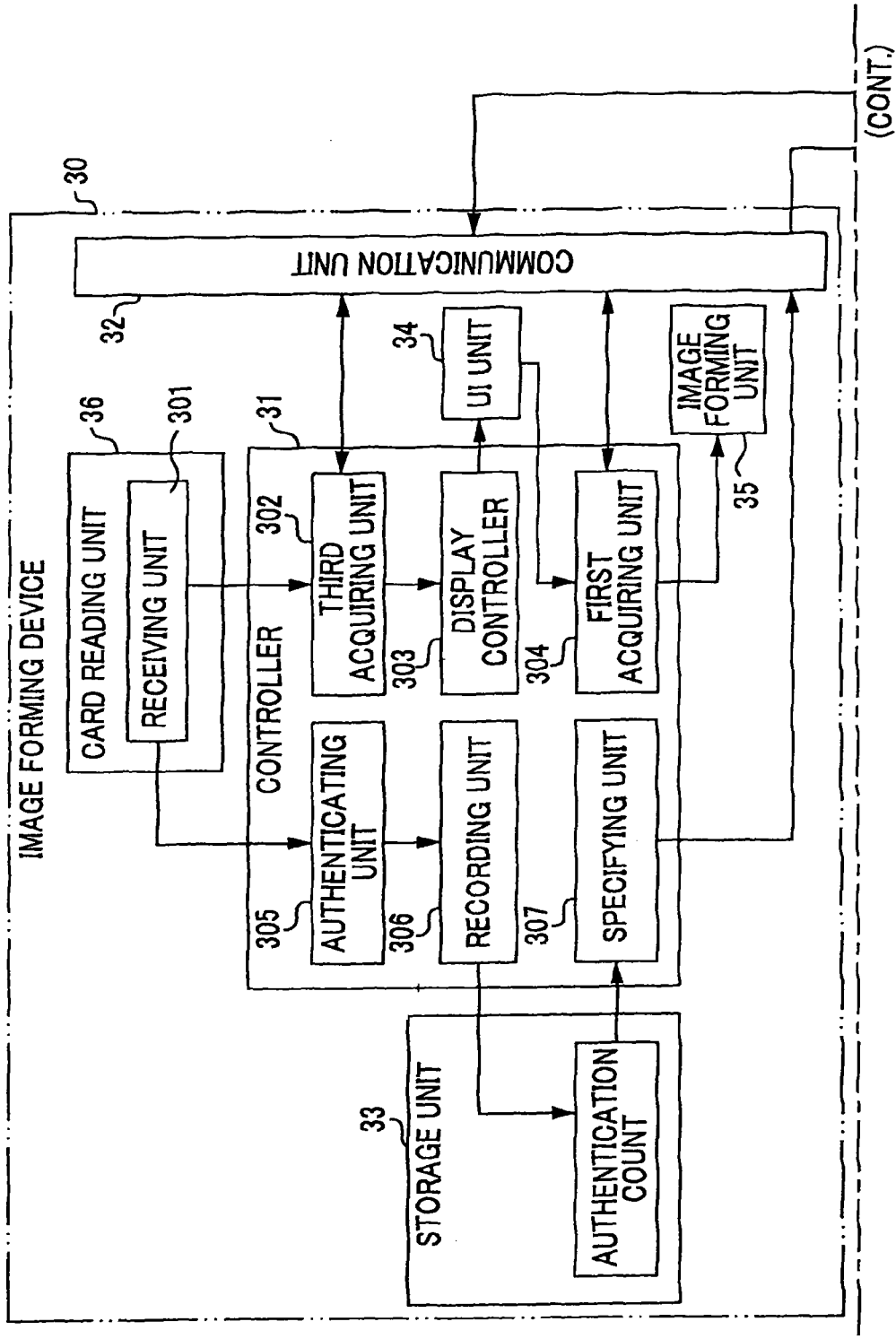

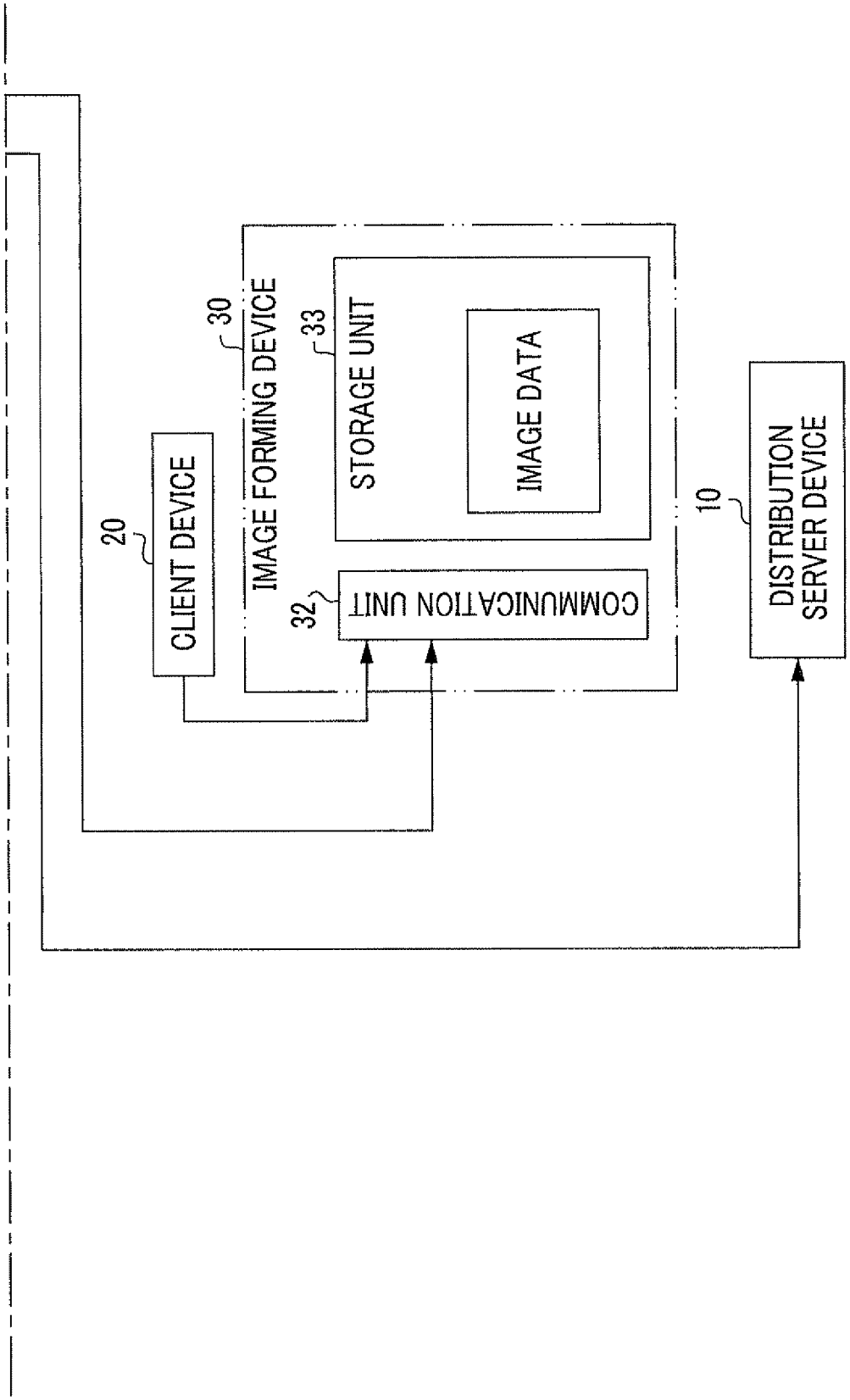

FIG. 15

| USER ID | SPOOLER INFORMATION | | |
|---|---|---|---|
| | 1 | 2 | 3 |
| user001 | spoolerB | spoolerA | spoolerC |
| user002 | spoolerB | spoolerC | ... |
| ... | ... | ... | ... |

41

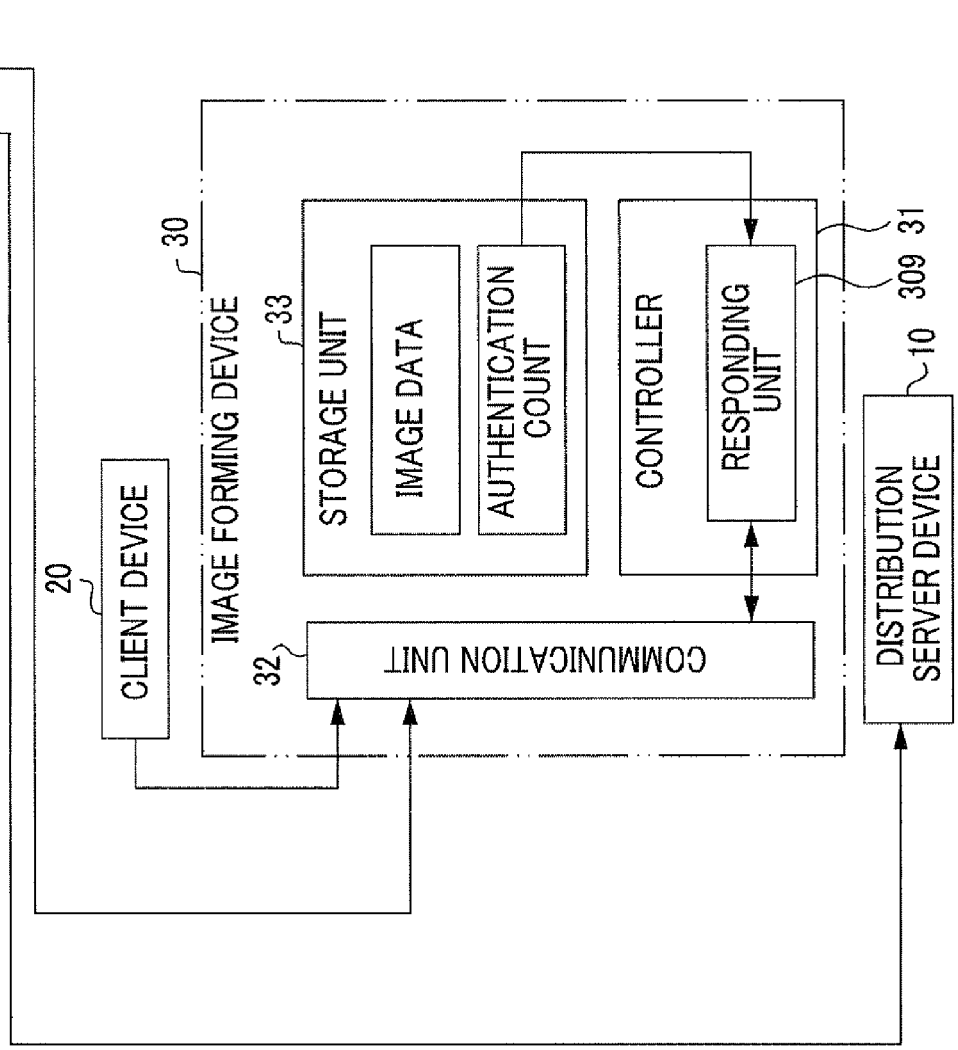

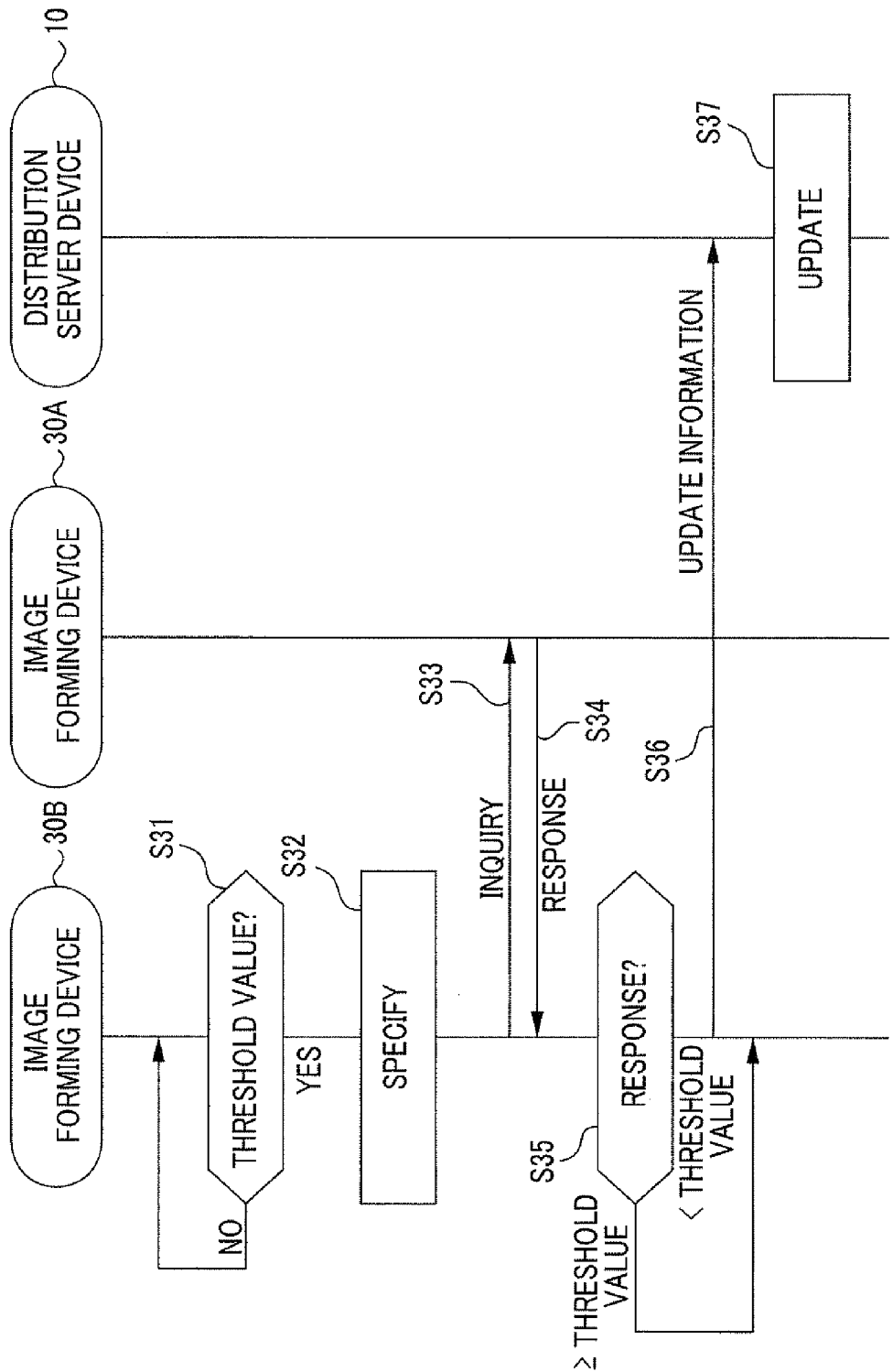

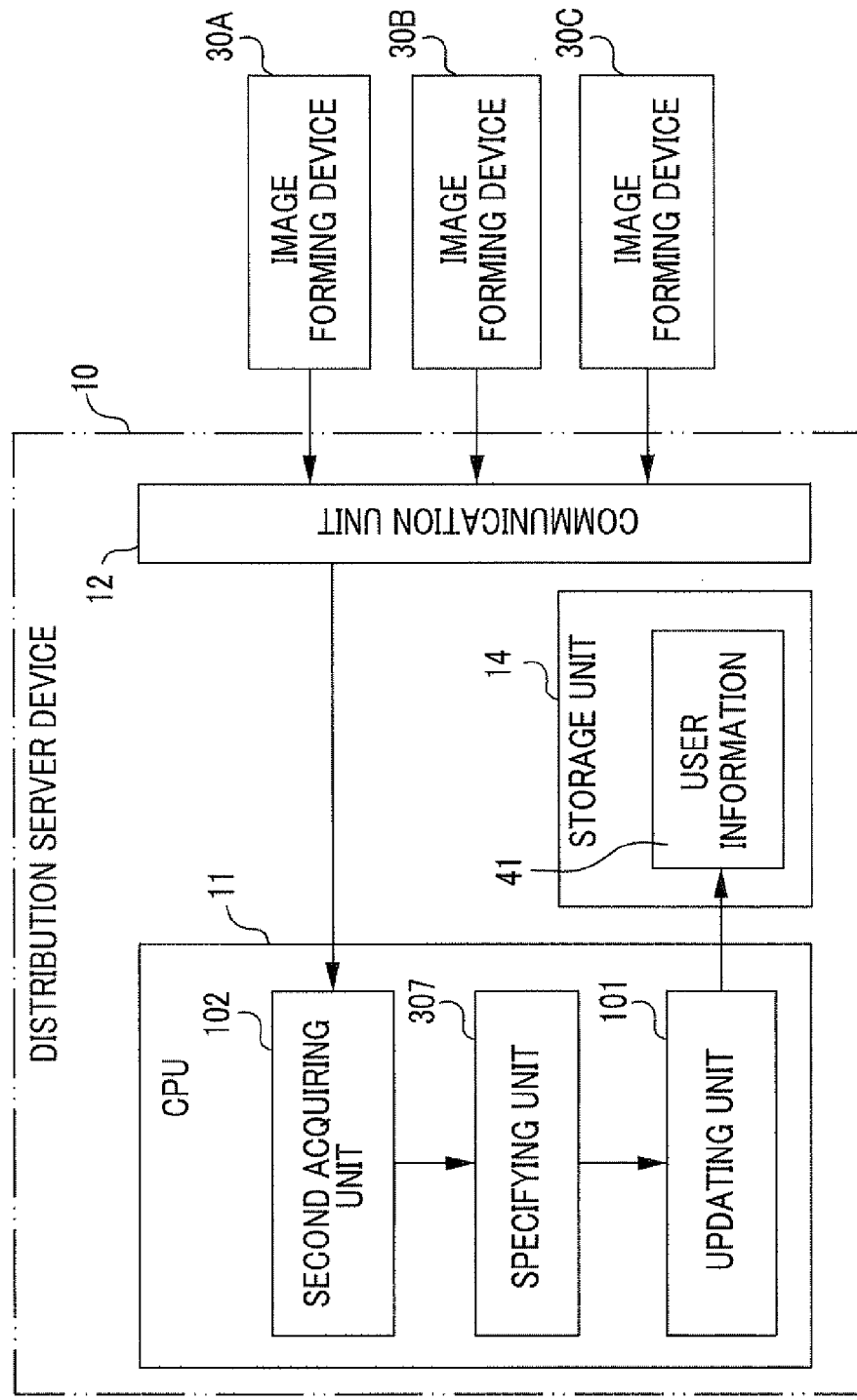

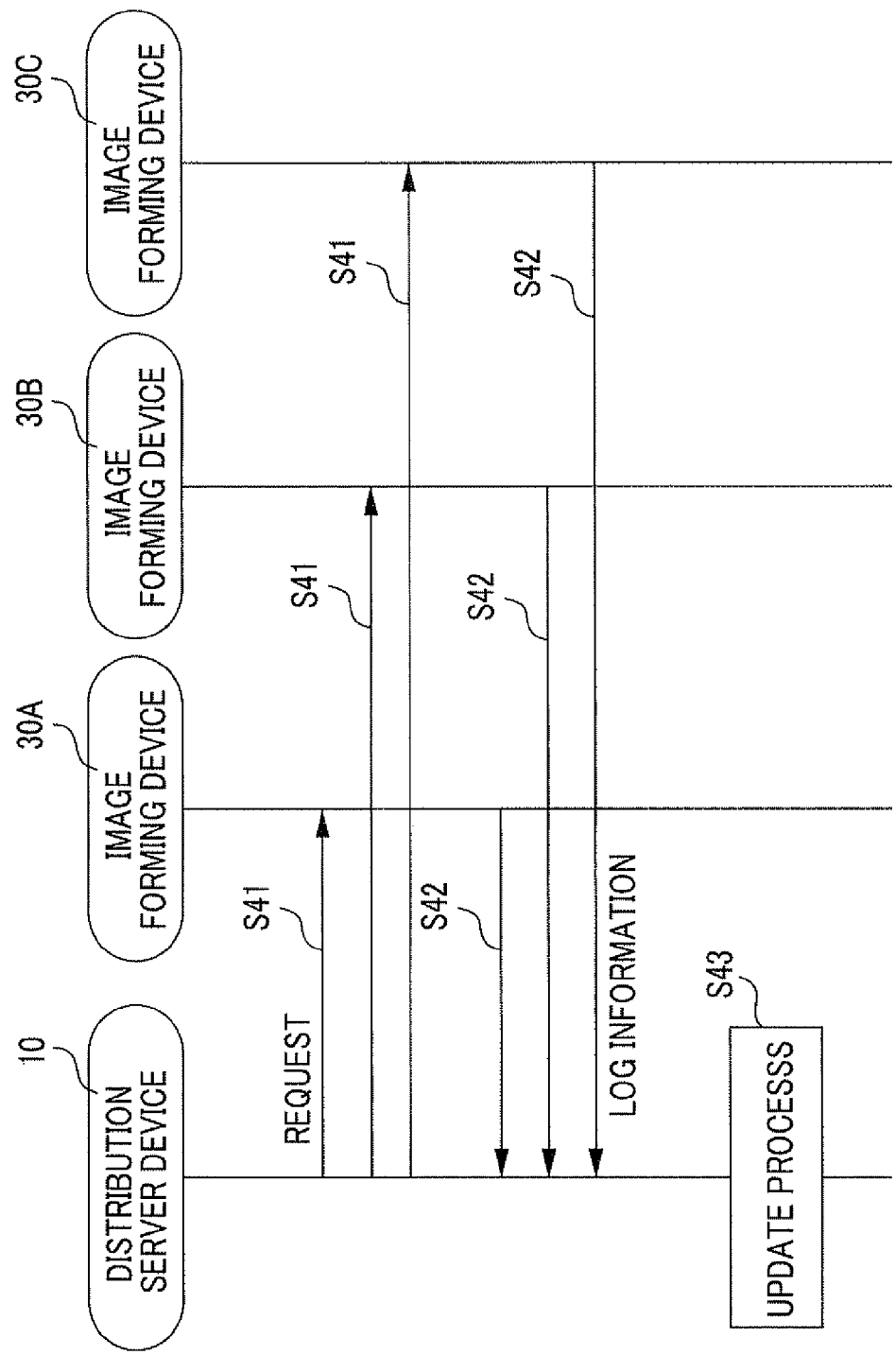

FIG. 20

| PROCESSING TIME | USER ID | PROCESSING TYPE |
|---|---|---|
| 2011/9/1/11:30 | user001 | PRINT |
| 2011/9/1/11:35 | user002 | PRINT |
| 2011/9/1/11:40 | user001 | SCAN |

| USER ID | PRINT COUNT | | |
|---|---|---|---|
| | IMAGE FORMING DEVICE 30A | IMAGE FORMING DEVICE 30B | IMAGE FORMING DEVICE 30C |
| user001 | 1 | 5 | 0 |
| user002 | 0 | 10 | 0 |
| ... | ... | ... | ... |

45

IMAGE FORMING SYSTEM, IMAGE FORMING DEVICE, AND NON-TRANSITORY COMPUTER READABLE MEDIUM FOR UPDATING INFORMATION BASED UPON A USAGE COUNT

CROSS-REFERENCE TO RELATED APPLICATIONS

This application is based on and claims priority under 35 USC 119 from Japanese Patent Application No. 2011-236281 filed Oct. 27, 2011.

BACKGROUND (i) Technical Field

The present invention relates to an image forming system, an image forming device, and a non-transitory computer readable medium.

(ii) Related Art

A technique of storing image data designated by a user in a print server device so that the image data may be accessed from plural image forming devices is known.

SUMMARY

According to an aspect of the present invention, there is provided an image forming system including: plural image forming devices; a first storage unit that stores user information for identifying a user and device information indicating an image forming device included in the plural image forming devices in a correlated manner; a transmitting device that transmits image data to an image forming device correlated with the user information indicated by the device information stored in the first storage unit; a second storage unit that is provided in each of the image forming devices and stores the image data transmitted from the transmitting device; a receiving unit that is provided in each of the image forming devices and receives an input of the user information; a first acquiring unit that is provided in each of the image forming devices and acquires image data corresponding to the user information from an image forming device correlated with the input user information indicated by the device information stored in the first storage unit; an image forming unit that is provided in each of the image forming devices and forms an image corresponding to the image data acquired by the first acquiring unit; a recording unit that is provided in each of the image forming devices and records a use history of the image forming device corresponding to the input user information in the second storage unit; a specifying unit that specifies the image forming device and the user information based on the use history recorded by the recording unit when a use frequency corresponding to the input user information satisfies a predetermined condition; and an updating unit that updates the device information stored in the first storage unit so that the specified image forming device and the specified user information are stored in a correlated manner.

BRIEF DESCRIPTION OF THE DRAWINGS

Exemplary embodiments of the present invention will be described in detail based on the following figures, wherein:

FIG. 3 is a diagram showing an example of user information stored in the distribution server device;

FIG. 7 is a diagram showing an example of user information stored in the image forming device;

FIG. 8 is a diagram showing the functional configurations of the image forming device according to the first exemplary embodiment;

FIG. 15 is a diagram showing an example of user information after updating;

FIG. 17 is a sequence chart showing a user information updating operation according to the second exemplary embodiment;

FIG. 18 is a diagram showing the functional configurations of a distribution server device according to a third exemplary embodiment;

FIG. 19 is a sequence chart showing a user information updating operation according to the third exemplary embodiment;

FIG. 20 is a diagram showing an example of a log;

FIG. 22 is a diagram showing an example of total information.

DETAILED DESCRIPTION

First Exemplary Embodiment

1. Configuration of Image Forming System

Figure 1:
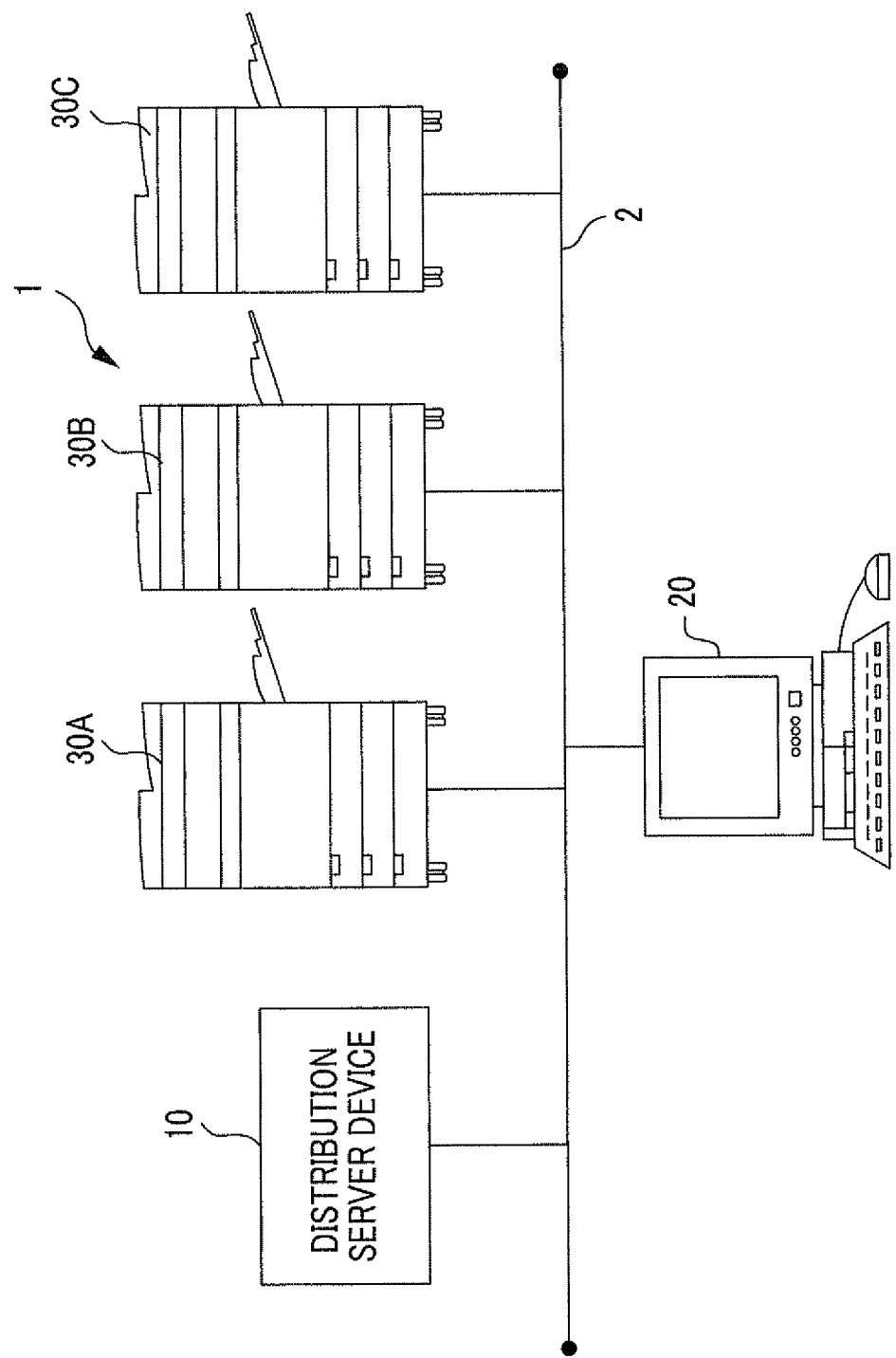
FIG. 1 is a schematic diagram showing the configuration of an image forming system according to a first exemplary embodiment.

FIG. 1 is a schematic diagram showing the configuration of an image forming system 1 according to the first exemplary embodiment. The image forming system 1 includes a distribution server device 10, a client device 20, and image forming devices 30A, 30B, and 30C. The distribution server device 10, the client device 20, and the image forming devices 30A, 30B, and 30C are connected to each other via a communication line 2. The image forming system 1 has a structure such that a user may store image data in any of the image forming devices 30 and form an image corresponding to the image data using any image forming device 30. In the following description, the image forming devices 30A, 30B, and 30C may sometimes be collectively referred to as "image forming device 30" when they need not be distinguished from each other.

Figure 2:
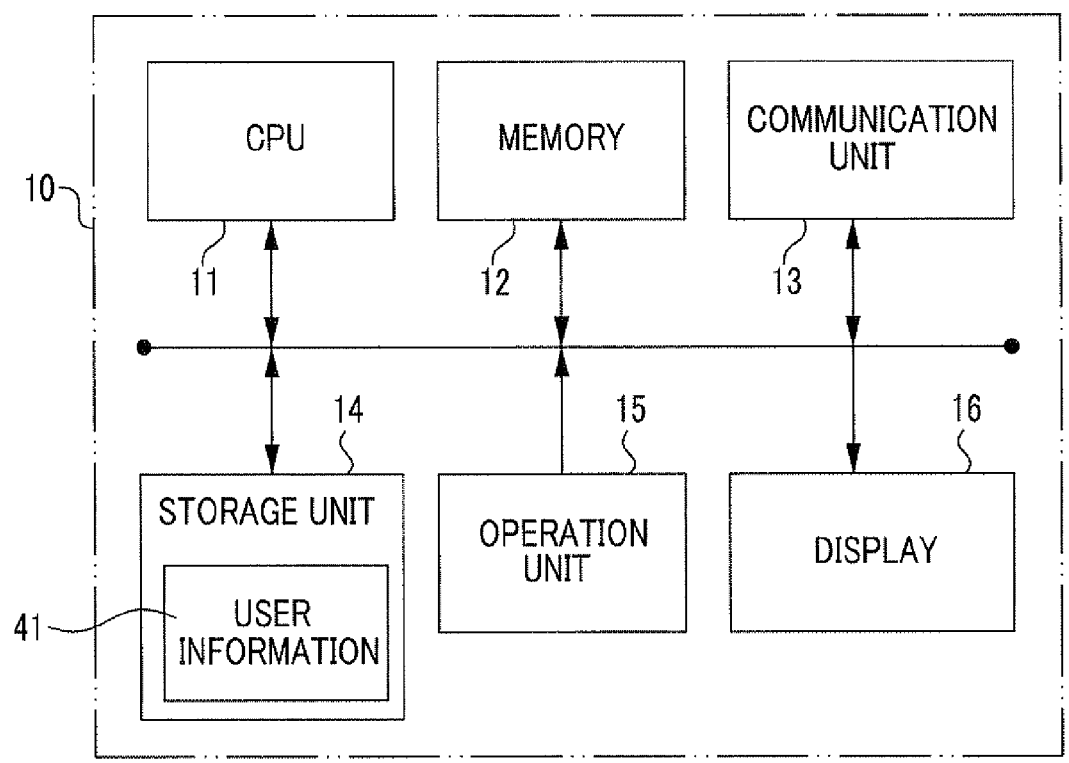
FIG. 2 is a diagram showing a hardware configuration of a distribution server device.

FIG. 2 is a diagram showing a hardware configuration of the distribution server device 10. The distribution server device 10 includes a central processing unit (CPU) 11, a memory 12, a communication unit 13, a storage unit 14, an operation unit 15, and a display 16. The CPU 11 controls each unit of the distribution server device 10 by executing a program stored in the memory 12. The communication unit 13 is a communication interface connected to the communication line 2. The distribution server device 10 communicates with the client device 20 or the image forming device 30 using the communication unit 13. The storage unit 14 is a storage device such as a hard disk. User information 41 is stored in the storage unit 14. The storage unit 14 is used as a first storage unit. The operation unit 15 includes a keyboard and a mouse, for example. The operation unit 15 is used for operating the distribution server device 10. The display 16 is a display device such as a liquid crystal display.

FIG. 3 is a diagram showing an example of the user information 41. In the user information 41, a user ID is correlated with plural spooler information. The user ID is information for identifying a user. The spooler information is information indicating the image forming device 30 in which image data is stored. As the spooler information, an Internet protocol (IP) address or an identification number allocated to an image forming device, for example, are used. The spooler information "spoolerA," "spoolerB," and "spoolerC" shown in FIG. 3 indicate the image forming devices 30A, 30B, and 30C, respectively. Moreover, a priority order is allocated to the spooler information. The numbers "1," "2," and "3" shown in FIG. 3 indicate the priority orders allocated to the spooler information, respectively. In the following description, spooler information to which the priority order "1" is allocated is referred to as "primary spooler information," and spooler information to which the priority order "2" is allocated is referred to as "secondary spooler information."

When the user information 41 is created, two spooler information randomly selected from "spoolerA," "spoolerB," and "spoolerC," for example, are allocated to each user ID. In this case, one priority order randomly selected from the priority orders "1" and "2" is also correlated with each spooler information. In the user information 41 shown in FIG. 3, primary spooler information "spoolerA" and secondary spooler information "spoolerC" are correlated with the user ID "user001." This means that image data corresponding to the user ID "user001" are stored in the image forming device 30A or the image forming device 30C. In this case, the image forming device 30A is used preferentially than the image forming device 30C.

Figure 4:
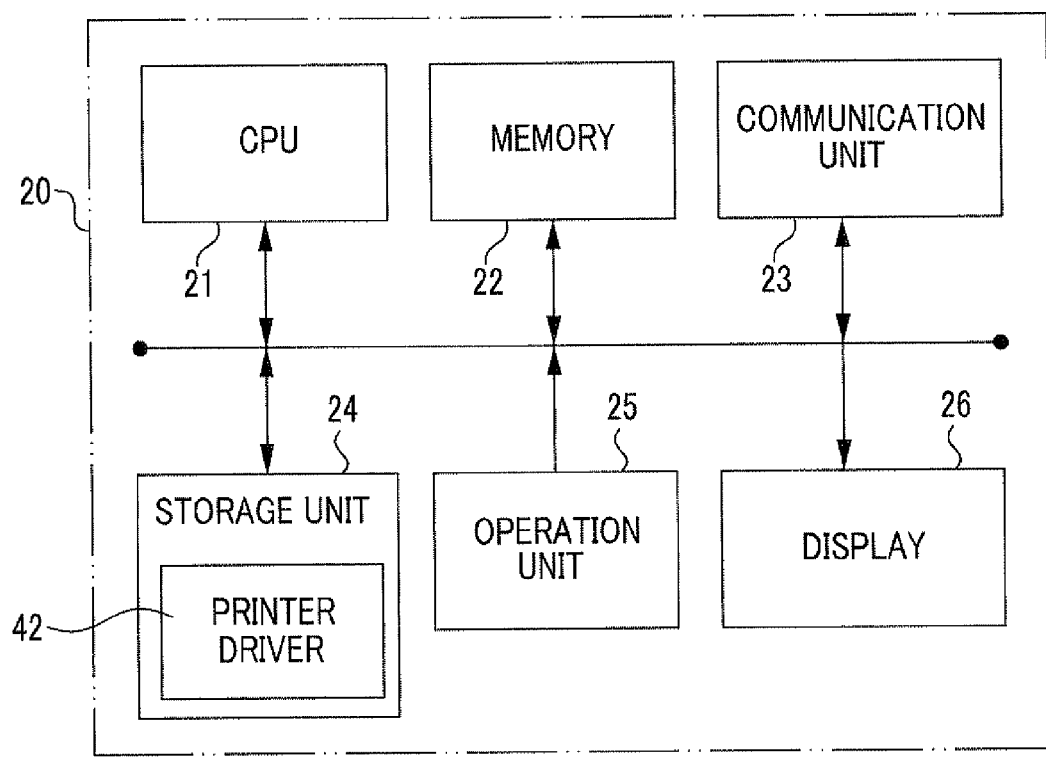
FIG. 4 is a diagram showing a hardware configuration of a client device.

FIG. 4 is a diagram showing a hardware configuration of the client device 20. The client device 20 includes a CPU 21, a memory 22, a communication unit 23, a storage unit 24, an operation unit 25, and a display 26. The CPU 21 controls each unit of the client device 20 by executing a program stored in the memory 22. The communication unit 23 is a communication interface connected to the communication line 2. The client device 20 communicates with the distribution server device 10 or the image forming device 30 using the communication unit 23. The storage unit 24 is a storage device such as a hard disk. A printer driver 42 is stored in the storage unit 24. The printer driver 42 is a program having a function of controlling the image forming device 30. The operation unit 25 includes a keyboard and a mouse, for example. The operation unit 25 is used for operating the client device 20. The display 26 is a display device such as a liquid crystal display.

Figure 5:
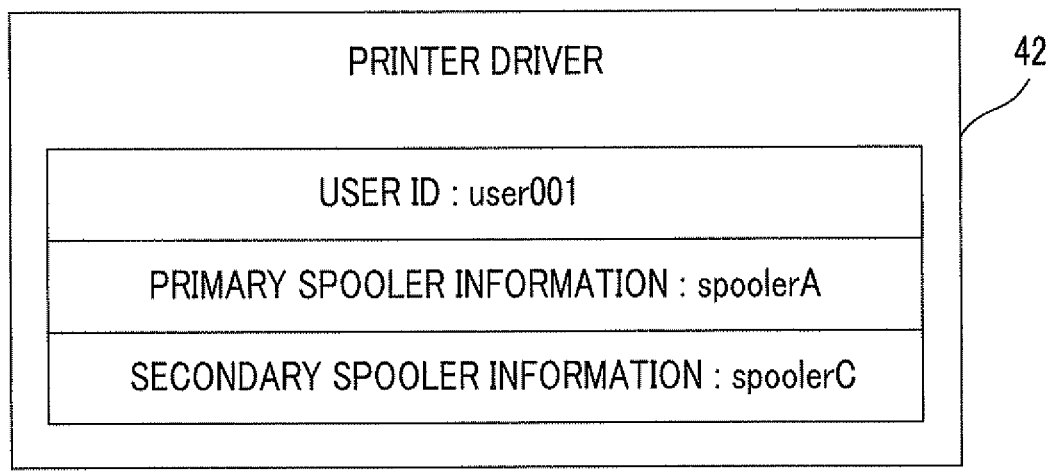
FIG. 5 is a diagram showing an example of information set to a printer driver.

Information necessary when transmitting image data to the image forming device 30 is set in the printer driver 42. FIG. 5 is a diagram showing an example of the information set in the printer driver 42. In the printer driver 42, the user ID "user001," the primary spooler information "spoolerA," and the secondary spooler information "spoolerC" included in the user information 41 shown in FIG. 3 are set. Only the primary spooler information and the secondary spooler information are set in the printer driver 42, and spooler information to which the priority order "3" is allocated is not set in the printer driver 42.

Figure 6:
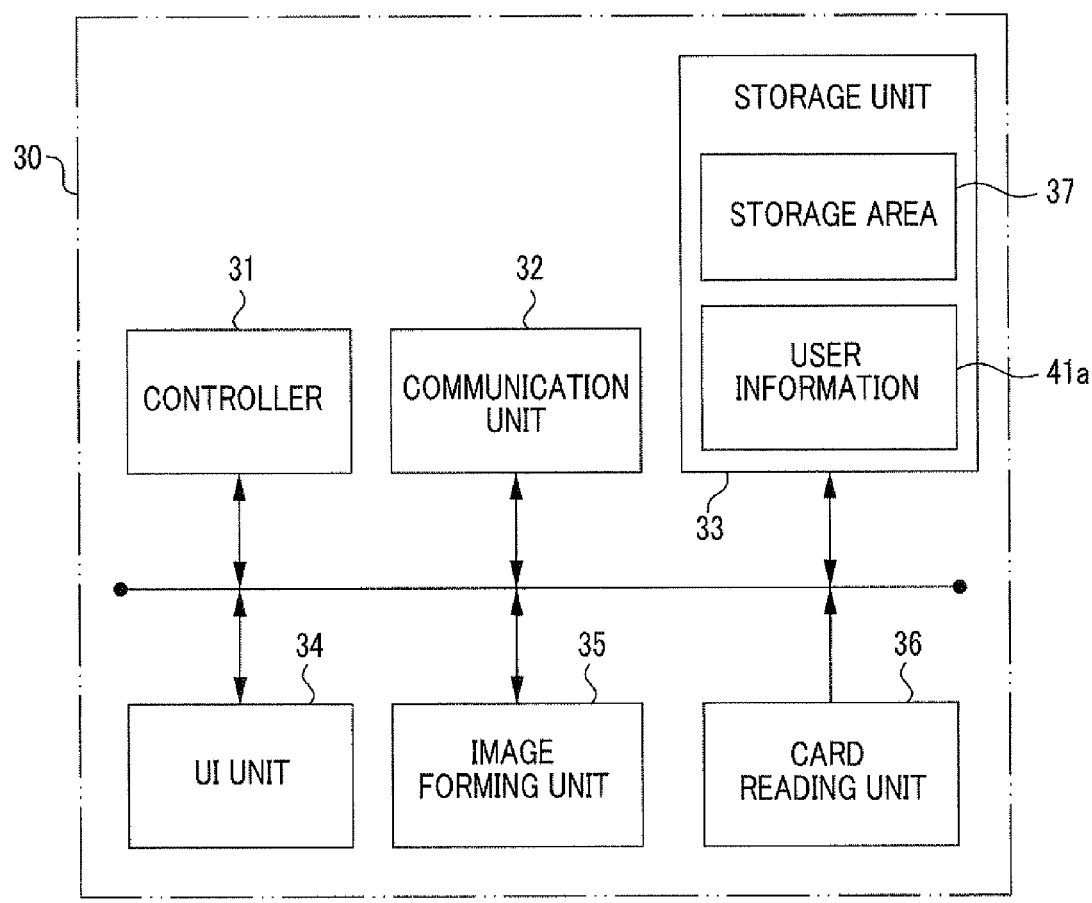
FIG. 6 is a diagram showing a hardware configuration of an image forming device.

FIG. 6 is a diagram showing a hardware configuration of the image forming device 30. The image forming device 30 includes a controller 31, a communication unit 32, a storage unit 33, a user interface (UI) unit 34, an image forming unit 35, and a card reading unit 36. The controller 31 controls each unit of the image forming device 30. The controller 31 includes a CPU and a memory, for example. The CPU realizes the function of the controller 31 by executing a program stored in the memory. The communication unit 32 is a communication interface connected to the communication line 2. The image forming device 30 communicates with the distribution server device 10, the client device 20, or the other image forming devices 30 using the communication unit 32. The storage unit 33 is a storage device such as a hard disk or a flash memory. The storage unit 33 includes a storage area 37 in which the image data are stored. The storage unit 33 is used as a second storage unit. Moreover, user information 41a corresponding to the above-described user information 41 is stored in the storage unit 33.

The UI unit 34 includes a touch screen and an operation button, for example. The UI unit 34 is used for operating the image forming device 30. The image forming unit 35 is an electrophotographic printer, for example. The image forming unit 35 forms (prints) an image corresponding to the image data on a medium such as a paper. The card reading unit 36 reads information stored in an integrated circuit (IC) card in a non-contact manner. The IC card is provided to a user in advance in order to perform authentication of the user. The user ID included in the above-described user information 41 is stored in the IC card. The image forming device 30 may include a configuration realizing the function of a scanner, a facsimile, and the like in addition to the above-described configuration. In the following description, when the configurations of the image forming devices 30A, 30B, and 30C need to be distinguished from each other, characters "A," "B," and "C" will be added to reference symbols of the configurations thereof.

FIG. 7 is a diagram showing an example of user information 41a. The user information 41a includes the same user ID and the same spooler information as the user information 41 shown in FIG. 3. Only the primary spooler information and the secondary spooler information are included in the user information 41a, and spooler information to which the priority order "3" is allocated is not included in the user information 41a.

Figure 9:
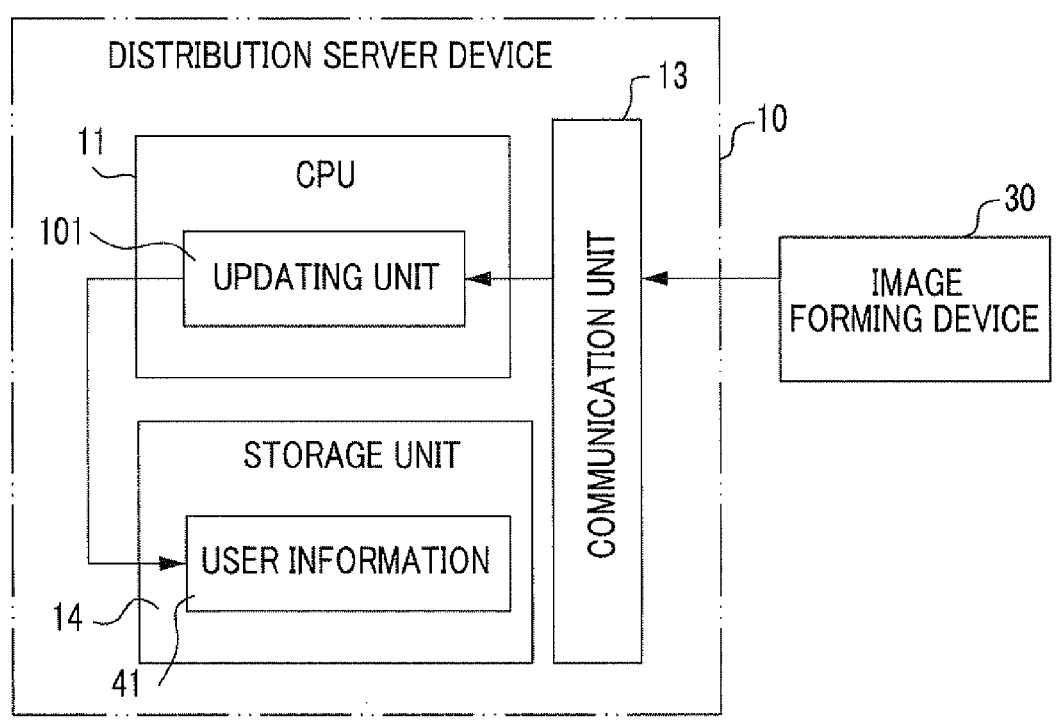
FIG. 9 is a diagram showing the functional configurations of the distribution server device according to the first exemplary embodiment.

FIG. 8 is a diagram showing the functional configurations of the image forming device 30. Respective image forming devices 30 have the same functional configuration. In FIG. 8, the functional configurations of one image forming device 30 are not illustrated for the other image forming device 30. A receiving unit 301 is realized by the card reading unit 36. A third acquiring unit 302, a display controller 303, a first acquiring unit 304, an authenticating unit 305, a recording unit 306, and a specifying unit 307 are realized when the CPU in the controller 31, for example, executes a program. These functional configurations of the image forming device 30 may be realized by a single program and may be realized by plural programs. FIG. 9 is a diagram showing a functional configuration of the distribution server device 10. An updating unit 101 is realized when the CPU 11 executes a program.

The client device 20 transmits image data corresponding to a user ID to the image forming device 30 indicated by the spooler information stored in the distribution server device 10 so as to be correlated with the user ID. Attribute information including information for identifying image data is appended to the image data. The spooler information is an example of device information indicating the image forming device 30. The client device 20 is used as a transmitting device. Practically, the client device 20 transmits image data based on the information set in the printer driver 42. However, as described above, the user ID and the spooler information included in the user information 41 stored in the distribution server device 10 are set in the printer driver 42. Thus, it may be said that the client device 20 transmits image data based on the user information 41 stored in the distribution server device 10.

The receiving unit 301 receives the input of the user ID. The user ID is an example of identification information for identifying a user. The third acquiring unit 302 acquires attribute information appended to image data corresponding to an input user ID from the image forming device 30 indicated by the primary spooler information and the image forming device 30 indicated by the secondary spooler information among the plural spooler information stored in the distribution server device 10 so as to be correlated with the input user ID. The primary spooler information and the secondary spooler information are examples of the first device information. These spooler information are a predetermined number (two) of spooler information selected based on a priority order. Practically, the third acquiring unit 302 acquires the attribute information based on the user information 41a stored in the storage unit 33. However, as described above, the same user ID and the same spooler information as the user information 41 stored in the distribution server device 10 are included in the user information 41a. Thus, it may be said that the third acquiring unit 302 acquires the attribute information based on the user information 41 stored in the distribution server device 10.

The display controller 303 displays the attribute information acquired by the third acquiring unit 302 on the UI unit 34. The UI unit 34 is used as a display. The first acquiring unit 304 acquires image data selected based on the attribute information displayed on the UI unit 34. The authenticating unit 305 performs user authentication using the input user ID. The recording unit 306 records an authentication count of authentication performed using each of the input user IDs in the storage unit 33. The authentication count is an example of the use history of the user. The authentication count is an authentication frequency calculated based on the authentication history of the user ID. That is, it may be said that the recording unit 306 records the authentication history and calculates the frequency of authentication performed using the user ID based on the authentication history. The specifying unit 307 specifies a user ID and an own device based on the authentication count recorded by the recording unit 306 when the authentication count corresponding to the user ID in the own device has reached a first threshold value and notifies the distribution server device 10 of spooler information indicating the specified user ID and own device. That is, the specifying unit 307 specifies a user ID and an own device when a condition that the authentication count of the own device corresponding to the user ID has reached a threshold value is satisfied. The updating unit 101 shown in FIG. 9 updates the spooler information of the user information 41 stored in the storage unit 14 so that the spooler information and the user ID notified from the image forming device 30 are stored in a correlated manner.

2. Operation of Image Forming System (1) Print Operation

Figure 10:
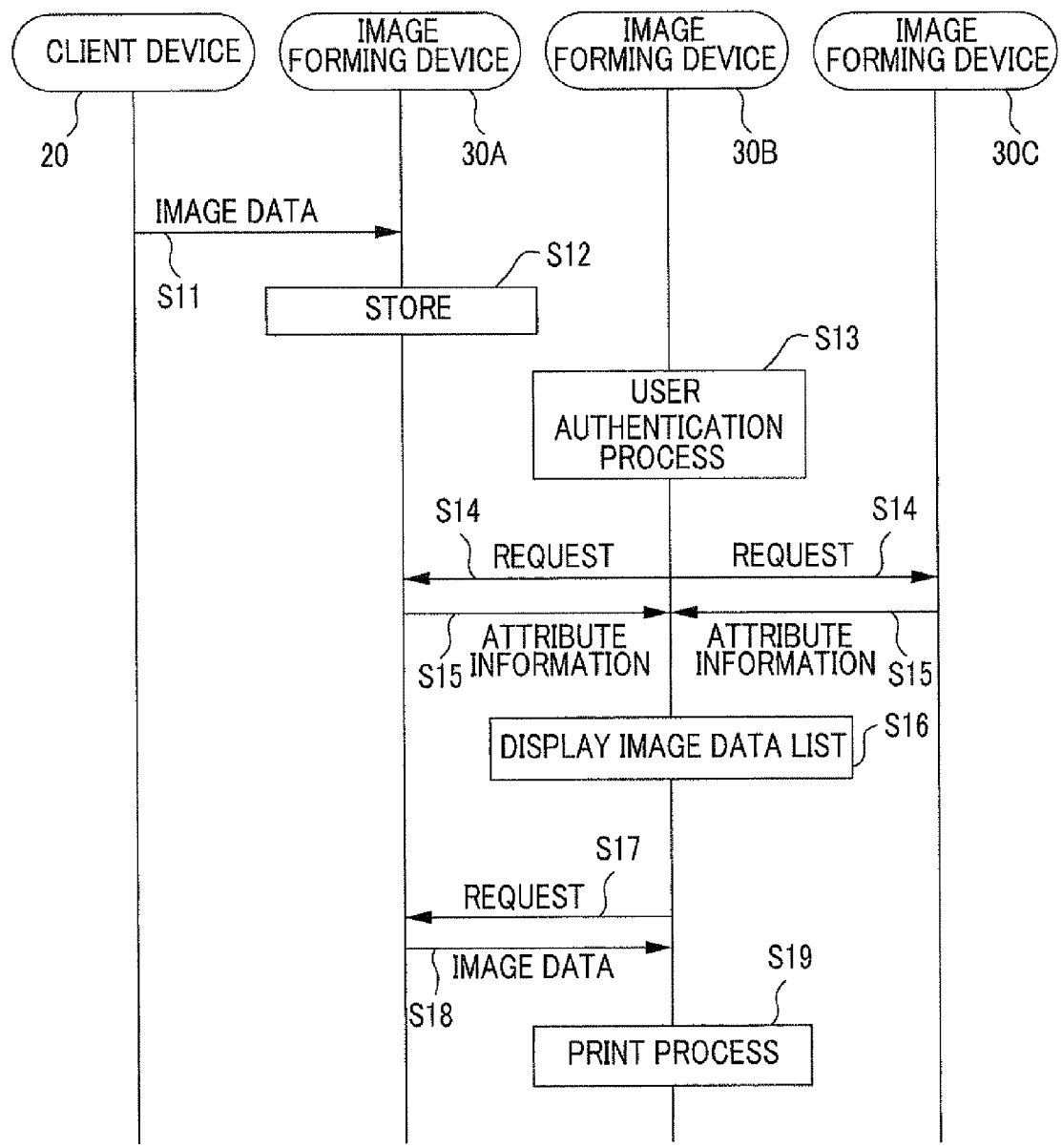
FIG. 10 is a sequence chart showing a print operation.

FIG. 10 is a sequence chart showing a print operation of the image forming system 1. The user operates the client device 20 to input a print instruction. Specifically, the user designates image data using the operation unit 25 and issues a print instruction. In this example, it is assumed that the user issues a print instruction by designating image data D1.

Upon receiving a print instruction, the client device 20 transmits image data D1 to the image forming device 30 based on the information set in the printer driver 42 (step S11). Specifically, the user ID "user001," the primary spooler information "spoolerA" and the secondary spooler information "spoolerC" are set in the printer driver 42 as shown in FIG. 5. In this case, the CPU 21 appends the attribute information including the user ID "user001" to the image data D1. In this way, the image data D1 is used as image data corresponding to the user ID "user001." Moreover, in addition to the user ID, information such as a file name for specifying the image data D1 is included in the attribute information.

After appending the attribute information, the CPU 21 controls the communication unit 23 to transmit the image data D1 to the image forming device 30A indicated by the primary spooler information "spoolerA." However, when a failure occurs in the image forming device 30A or a failure occurs in the communication line 2 between the client device 20 and the image forming device 30A, it is not possible to transmit the image data D1 to the image forming device 30A. As above, in a state where it is not possible to use the image forming device 30A, the CPU 21 controls the communication unit 23 to transmit the image data D1 to the image forming device 30C indicated by the secondary spooler information "spoolerC."

That is, the client device 20 transmits the image data corresponding to the user ID to the image forming device 30 which is available and indicated by spooler information having the highest priority order allocated thereto among the image forming devices 30 indicated by the spooler information set in the printer driver 42. Here, "available" means that image data may be stored in the image forming device 30. Whether the image forming device 30 is available or not is determined, for example, by transmitting an echo request to the image forming device 30 and determining whether an echo response is returned from the image forming device 30. When the image forming device 30 and the communication line 2 are operating properly, an echo response is returned from the image forming device 30. On the other hand, if a failure occurs in the image forming device 30 or a failure occurs in the communication line 2 between the client device 20 and the image forming device 30, an echo response is not returned from the image forming device 30. When no echo response is returned in a designated period, the client device 20 determines that the image forming device 30 is an unavailable state.

In this example, it is assumed that the image forming device 30A is available. In this case, the image data D1 is transmitted from the client device 20 to the image forming device 30A. Upon receiving the image data D1 from the client device 20, the image forming device 30A stores the image data D1 in a storage area 37A of the storage unit 33A (step S12).

After issuing the print instruction, the user moves to a place where one of the image forming devices 30A, 30B, and 30C is located. For example, the user may move to a place where the image forming device 30 usually used by the user is located. When the image forming device 30 usually used by the user is being used by another user, the user may move to a place where the nearby image forming device 30 is located. Moreover, the user may move to a place where the image forming device 30 nearest to the present location of the user is located. That is, the user moves to the place of the image forming device 30 so that the user may use anyone of the image forming devices 30A, 30B, and 30C. In this example, it is assumed that the user moves to the place of the image forming device 30B.

An authentication screen is displayed on the UI unit 34 of the image forming device 30, and unless authentication is performed, the operation on the image forming device 30 is not received. The user performs authentication by passing an IC card thereof over a card reading unit 36B in order to use the image forming device 30B. When the user ID is input via the card reading unit 36B, the image forming device 30B performs a user authentication process using the user ID (step S13).

Figure 11:
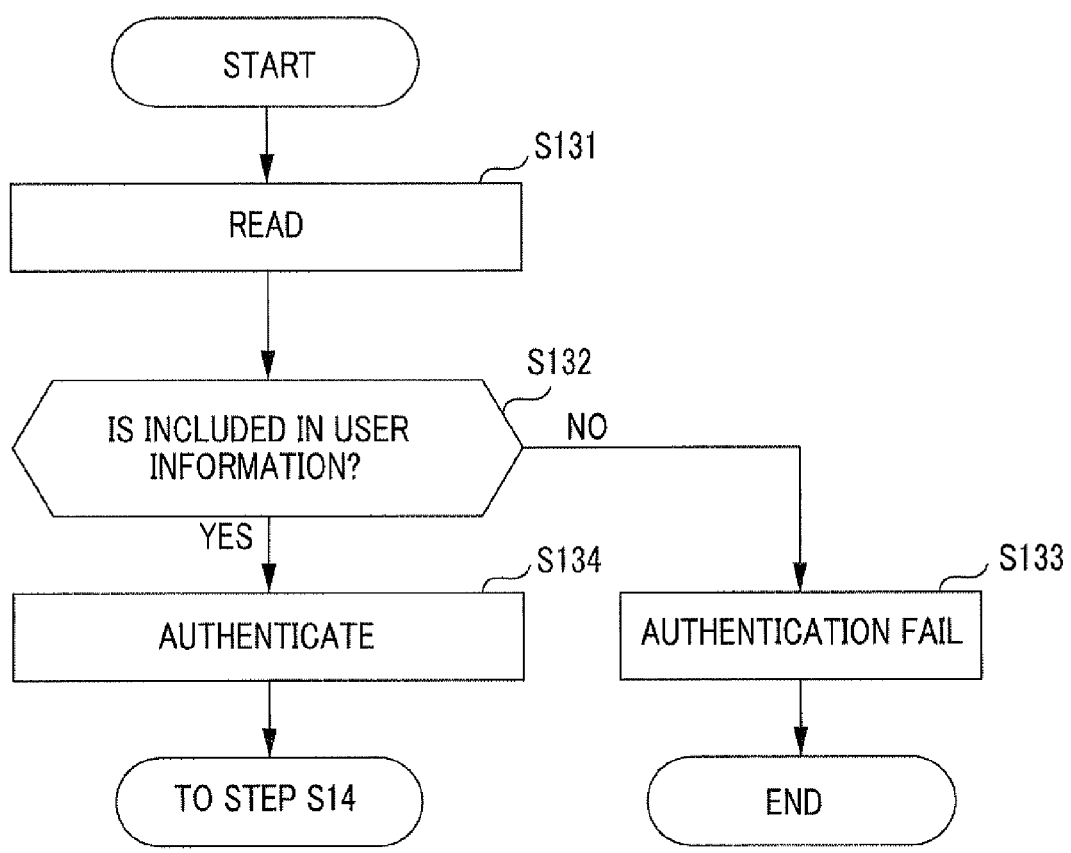
FIG. 11 is a flowchart showing a user authentication process.

FIG. 11 is a flowchart showing a user authentication process. In this example, it is assumed that a user ID "user001" is stored in the IC card. In this case, the card reading unit 36B reads the user ID "user001" from the IC card (step S131). A controller 31B determines whether or not the user ID "user001" is included in the user information 41a stored in the storage unit 33B (step S132). For example, when the user ID "user001" is not included in the user information 41a (step S132: NO), the controller 31B displays a message indicating authentication failure on the UI unit 34B (step S133), and this process ends. In this case, it is not possible for the user to use the image forming device 30B. On the other hand, as shown in FIG. 7, when the user ID "user001" is included in the user information 41a (step S132: YES), the controller 31B authenticates the user as an authenticated user (step S134), and the flow proceeds to the next step S14.

The image forming device 30B acquires the attribute information of image data corresponding to the user ID "user001" based on the user information 41a stored in the storage unit 33B. Specifically, as shown in FIG. 3, in the user information 41a, the primary spooler information "spoolerA" and the secondary spooler information "spoolerC" are correlated with the user ID "user001." In this case, the controller 31B controls the communication unit 32B sends a request for the attribute information of image data corresponding to the user ID "user001" to the image forming device 30A indicated by the primary spooler information "spoolerA" and the image forming device 30C indicated by the secondary spooler information "spoolerC" (step S14 of FIG. 10).

The image forming devices 30A and 30C transmit the attribute information to the image forming device 30B when the image forming devices 30A and 30C possess the attribute information requested from the image forming device 30B (step S15). As described above, the image data D1 is stored in the storage unit 33A of the image forming device 30A. The attribute information including the user ID "user001" is appended to the image data D1. In this case, the controller 31A reads the attribute information from the storage unit 33A and controls the communication unit 32A to transmit the attribute information to the image forming device 30B. Moreover, it is assumed that the image data D2 corresponding to a user ID "user001" is stored in the storage unit 33C of the image forming device 30C. Similarly to the image data D1, the attribute information including the user ID "user001" is appended to the image data D2. In this case, the controller 31C reads the attribute information from the storage unit 33C and controls the communication unit 32C to transmit the attribute information to the image forming device 30B. The image forming device 30B receives these attribute information from the image forming devices 30A and 30C.

Figure 12:
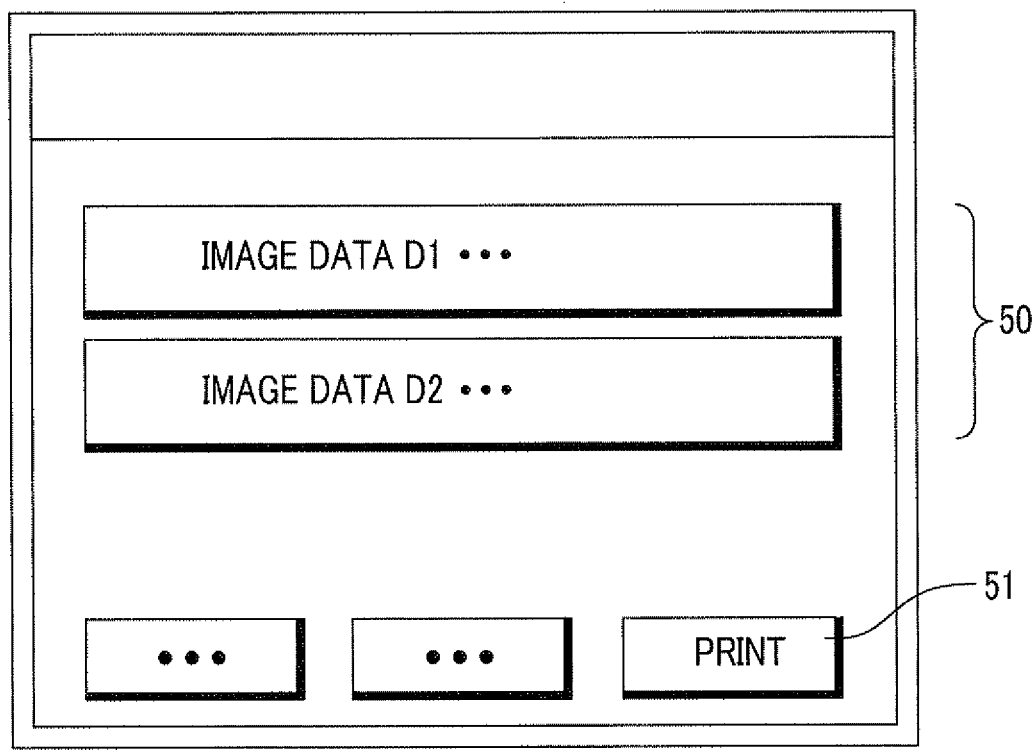
FIG. 12 is a diagram showing an example of an image data list.

Upon acquiring the attribute information, the image forming device 30B creates an image data list 50 using the attribute information and displays the image data list 50 on the UI unit 34B (step S16). FIG. 12 is a diagram showing an example of the image data list 50. In the image data list 50, the attribute information of the image data D1 acquired from the image forming device 30A and the attribute information of the image data D2 acquired from the image forming device 30C are arranged in a line. Moreover, a "PRINT" button 51 for receiving a print instruction is displayed on the UI unit 34B together with the image data list 50. The user select desired image data based on the image data list 50 displayed on the UI unit 34 and presses the "PRINT" button 51. In this example, it is assumed that the image data D1 is selected and the "PRINT" button 51 is pressed.

When the "PRINT" button 51 is pressed, the image forming device 30B acquires the image data D1 from the image forming device 30 in which the selected image data D1 is stored. Specifically, the controller 31B controls the communication unit 32B to send a request for the image data D1 to the image forming device 30A which is an origin that transmits the attribute information of the image data D1 (step S17). The image forming device 30A reads the image data D1 requested from the image forming device 30B from the storage unit 33A and transmits the image data D1 to the image forming device 30B (step S18). The image forming device 30B receives the image data D1 from the image forming device 30A.

Upon acquiring the image data D1, the image forming device 30B performs printing based on the image data D1 (step S19). Specifically, the controller 31B supplies the image data D1 to the image forming unit 35B and forms an image corresponding to the image data D1. The image forming unit 35B forms an image corresponding to the image data D1 on a medium under the control of the controller 31B.

(2) User Information Updating Operation

Figure 13:
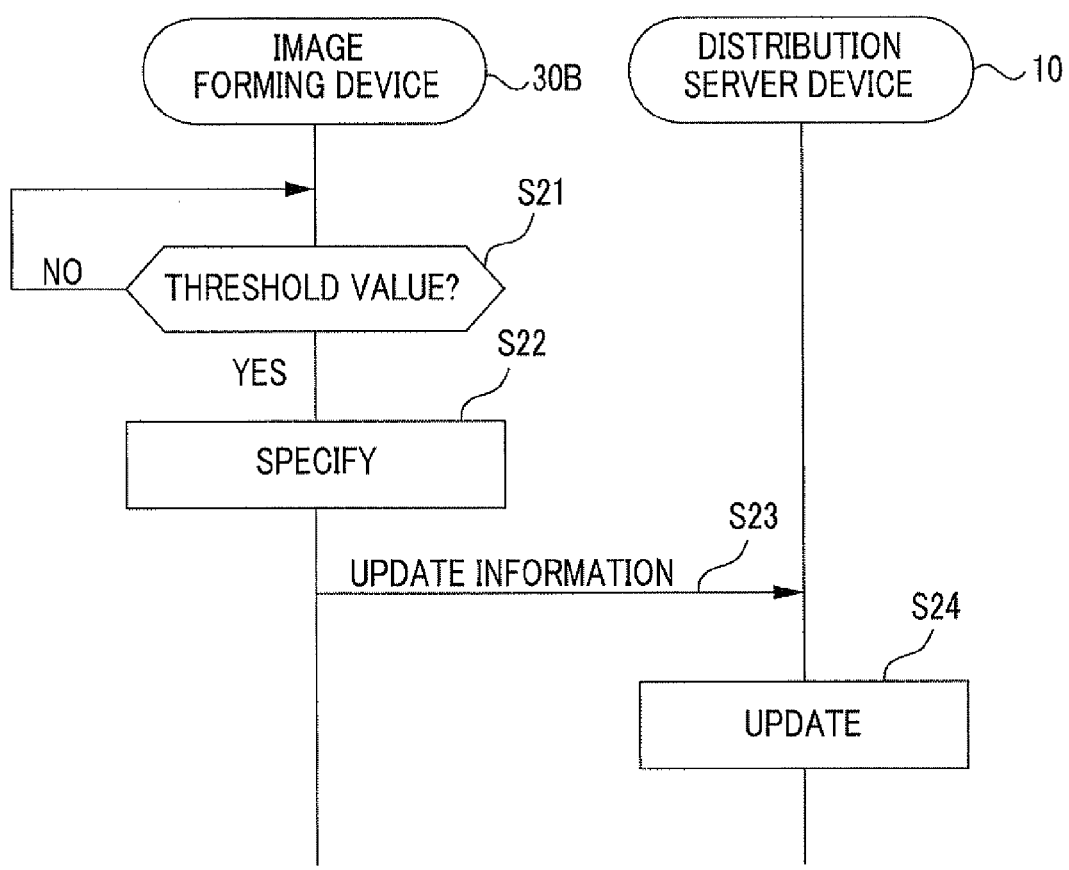
FIG. 13 is a sequence chart showing a user information updating operation according to the first exemplary embodiment.

The user information 41 stored in the distribution server device 10 is updated depending on which image forming device 30 is frequently used by the user. FIG. 13 is a sequence chart showing an operation of updating the user information 41. The image forming device 30 records an authentication count for each user ID. Specifically, the controller 31 measures an authentication count of a user authentication process performed using each of the user IDs. However, the controller 31 does not measure an authentication count for a user ID in the user information 41a stored in the storage unit 33, which is correlated with spooler information indicating the own device.

Figure 14:
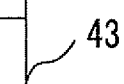
FIG. 14 is a diagram showing an example of recorded information.

For example, when the image forming device 30B has performed a user authentication process using the user ID "user001," the controller 31B increases the authentication count corresponding to the user ID "user001" by 1. The controller 31 records the measured authentication count in recording information 43. The recording information 43 is stored in the storage unit 14. FIG. 14 is a diagram showing an example of the recording information 43 stored in the image forming device 30B. In the recording information 43, "5" is recorded as the authentication count corresponding to the user ID "user001." This indicates that the image forming device 30B has performed the user authentication process "five times" using the user ID "user001." This authentication count is reset once a day, for example. Alternatively, the authentication count may be reset once several days. In this case, the authentication count is measured every several days.

When the authentication count recorded in the recording information 43 has reached a threshold value, the image forming device 30 specifies a user ID and an own device corresponding to the authentication count and notifies the distribution server device 10 of the spooler information indicating the user ID and the own device. Specifically, the controller 31 determines whether or not the authentication count included in the recording information 43 has reached a threshold value (step S21 of FIG. 13). In this example, it is assumed that the threshold value is "5."

When all of the authentication counts included in the recording information 43 have not reached the threshold value (step S21: NO), the controller 31B returns to step S21. On the other hand, in the recording information 43 shown in FIG. 14, for example, the authentication count corresponding to the user ID "user001" has reached the threshold value "5" (step S21: YES). In this case, the controller 31B specifies the user ID "user001" and the image forming device 30B (step S22). The controller 31B controls the communication unit 32B to transmit update information including the user ID "user001" and the spooler information "spoolerB" indicating the own device to the distribution server device 10 (step S23). In this way, the user ID specified in the image forming device 30B and the spooler information indicating the image forming device 30B are notified to the distribution server device 10.

Upon receiving the update information from the image forming device 30, the distribution server device 10 updates the user information 41 stored in the storage unit 14 at a predetermined time (for example, once every night at midnight) (step S24). FIG. 15 is a diagram showing an example of the user information 41 after update. Specifically, as described above, when the update information including the user ID "user001" and the spooler information "spoolerB" is received from the image forming device 30B, the CPU 11 lowers, by one step, the priority order of the primary spooler information "spoolerA" and the secondary spooler information "spoolerC" correlated with the user ID "user001" in the user information 41 shown in FIG. 3. In this way, as shown in FIG. 15, the priority order of the primary spooler information "spoolerA" is changed from "1" to "2" and the priority order of the secondary spooler information "spoolerC" is changed from "2" to "3." Moreover, the CPU 11 stores the spooler information "spoolerB" received from the image forming device 30B as the primary spooler information of the user ID "user001." In this way, as shown in FIG. 15, the user ID "user001" and the primary spooler information "spoolerB" are stored in a correlated manner. When plural update information including the same user ID are received from the image forming device 30, the distribution server device 10 performs the process of step S24 based on the update information received lately.

(3) User Information Distributing Operation

The distribution server device 10 distributes the user information 41a corresponding to the latest user information 41 to the image forming device 30 in order to synchronize the user information 41 stored in the storage unit 14 with the user information 41a stored in the image forming device 30. Specifically, the CPU 11 reads the user information 41 from the storage unit 14 at a predetermined time (for example, once every night at midnight). The CPU 11 extracts the user ID, the primary spooler information, and the secondary spooler information from the user information 41 to create the user information 41a. The spooler information to which the priority order "3" is allocated is not included in the user information 41a. The CPU 11 controls the communication unit 13 to transmit the created user information 41a to the image forming devices 30A, 30B, and 30C. Upon receiving the user information 41a from the distribution server device 10, the image forming devices 30A, 30B, and 30C store the user information 41a in the storage units 33A, 33B, and 33C, respectively. In this way, the user information 41a stored in each of the image forming devices 30A, 30B, and 30C is updated.

(4) Printer Driver Updating Operation

The client device 20 updates the spooler information set in the printer driver 42 in order to synchronize the spooler information set in the printer driver 42 with the spooler information of the user information 41 stored in the distribution server device 10. Specifically, when a predetermined time comes, the CPU 21 controls the communication unit 13 to send a request for the spooler information corresponding to the user ID "user001" set in the printer driver 42 to the distribution server device 10. The predetermined time is when the first print instruction is received on each day, for example.

The distribution server device 10 extracts the spooler information requested from the client device 20 from the user information 41 stored in the storage unit 14 and transmits the spooler information to the client device 20. Specifically, the CPU 11 extracts the primary spooler information "spoolerB" and the secondary spooler information "spoolerA" correlated with the user ID "user001" requested to the client device 20 from the user information 41 shown in FIG. 15. The CPU 11 controls the communication unit 13 to transmit the extracted spooler information to the client device 20. The spooler information "spoolerC" to which the priority order "3" is allocated is not transmitted to the client device 20. Upon receiving the spooler information from the distribution server device 10, the client device 20 sets the received spooler information in the printer driver 42. In this way, the spooler information set in the printer driver 42 is updated.

(5) Image Data Retrieving Operation

The image data stored in the image forming device 30 are not deleted but remain undeleted even after used for printing. This is because the user may sometime perform printing repeatedly using the same image data. However, in the example shown in FIG. 15, the priority order of the spooler information "spoolerC" correlated with the user ID "user001" is changed from "2" to "3" due to the updating of the user information 43. On the other hand, spooler information "spoolerC" to which the priority order "3" is allocated is not included in the user information 41a distributed from the distribution server device 10 to the image forming device 30. If so, after the user information 41 is updated, the image data stored in the image forming device 30C indicated by the spooler information before the user information 41 is updated are not acquired.

The image forming system 1 has a structure that retrieves such image data. In this example, it is assumed that the user performs printing using the image forming device 30B. In the image forming device 30B, the user ID "user001" is input by the user. The image forming device 30B displays a retrieval button on the UI unit 34B together with the image data list 50 when displaying the image data list 50 in step S16 shown in FIG. 10. The retrieval button is used for receiving an instruction to acquire the attribute information of another image data corresponding to the user ID "user001." The user presses this retrieval button when the attribute information of image data designated by the user is not included in the image data list 50 displayed in the UI unit 34B. When the retrieval button is pressed, the image forming device 30B acquires spooler information (an example of second device information) other than the primary spooler information and the secondary spooler information, corresponding to the user ID "user001" from the distribution server device 10.

Specifically, the controller 31B controls the communication unit 32B to send a request for the spooler information other than the primary spooler information and the secondary spooler information, corresponding to the user ID "user001." The distribution server device 10 reads the spooler information requested from the image forming device 30B from the storage unit 14 and transmits the spooler information to the image forming device 30B. Specifically, as shown in FIG. 15, the primary spooler information "spoolerB," the secondary spooler information "spoolerA," and the spooler information "spoolerC" to which the priority order "3" is allocated are included in the user information 41 so as to be correlated with the user ID "user001." The CPU 11 extracts the spooler information "spoolerC" having the priority order "3" among these spooler information. The CPU 11 controls the communication unit 13 to transmit the extracted spooler information to the image forming device 30B.

Upon receiving the spooler information "spoolerC" from the distribution server device 10, the image forming device 30B acquires the attribute information of the image data corresponding to the user ID "user001" from the image forming device 30C indicated by the spooler information similarly to steps S14 and S15 shown in FIG. 10. The image forming device 30B adds the acquired attribute information to the image data list 50. The subsequent processes are the same as those of steps S17 to S19 shown in FIG. 10.

In the first exemplary embodiment, when the authentication count corresponding to a certain user ID in the image forming device 30 has reached a threshold value, the user information 41 stored in the distribution server device 10 is updated, and the image data corresponding to the user ID are stored in the image forming device 30. The authentication count is information indicating the use frequency of the image forming device 30. Thus, according to the first exemplary embodiment, image data is stored in an image forming device corresponding to the use frequency of the user.

Moreover, in the first exemplary embodiment, each image forming device 30 performs a process of determining whether or not the authentication count has reached a threshold value. Thus, the processing load is distributed more than a case where these processes are performed solely by the distribution server device 10. Moreover, in the first exemplary embodiment, the primary spooler information and the secondary spooler information are set in the printer driver 42. Thus, even when it is not possible to use the image forming device 30 indicated by one spooler information, image data is stored in the other image forming device 30. Furthermore, in the first exemplary embodiment, even when image data is stored in the image forming device 30 indicated by the spooler information other than the primary spooler information and the secondary spooler information, when the retrieval button is pressed, the attribute information and the image data is acquired from the image forming device 30, and an image corresponding to the acquired image data is formed.

Second Exemplary Embodiment

In a second exemplary embodiment, the operation of updating the user information 41 is different from that of the first exemplary embodiment. In the first exemplary embodiment described above, for example, in the image forming device 30B, when the authentication count corresponding to the user ID "user001" has reached a threshold value, the user information 41 stored in the distribution server device 10 is updated, and the spooler information "spoolerB" indicating the image forming device 30B is stored as the primary spooler information of the user ID "user001" as shown in FIG. 15. However, the user may also frequently use the image forming device 30A in addition to the image forming device 30B, indicated by the primary spooler information "spoolerA" correlated with the user ID "user001" in the user information 41 before updating shown in FIG. 3. In this case, if the user information 41 is updated, a problem may occur. The image forming system 1 according to the second exemplary embodiment has a structure such that the user information 41 is not updated in such a case. Since the other configurations and operations are the same as those of the first exemplary embodiment, description thereof will not be provided.

Figure 16:
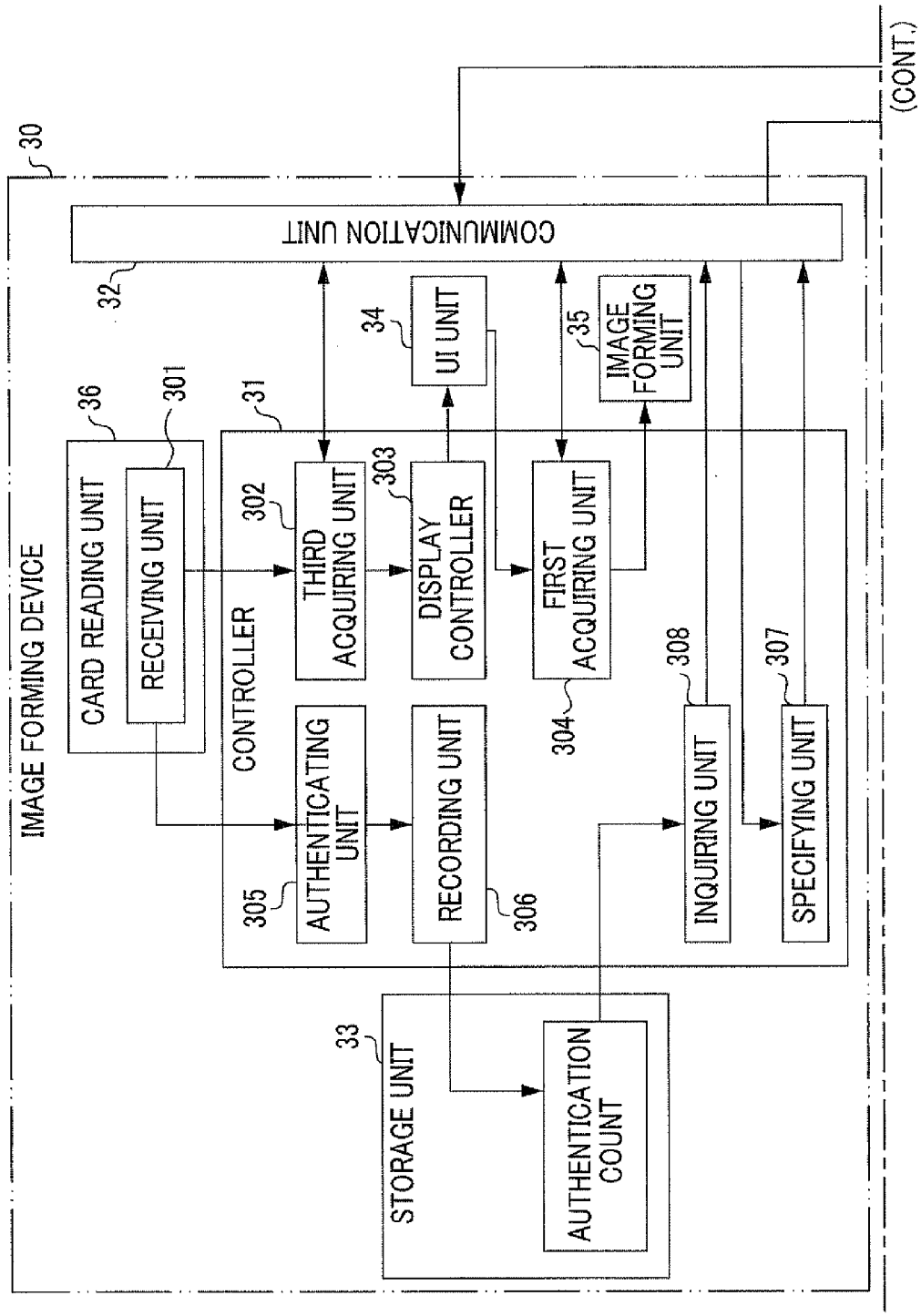
FIG. 16 is a diagram showing the functional configurations of an image forming device according to a second exemplary embodiment.

FIG. 16 is a diagram showing the functional configurations of the image forming device 30 according to the second exemplary embodiment. The same functional configurations as those shown in FIG. 8 will not be described. An inquiring unit 308 and a responding unit 309 are realized when the CPU in the controller 31, for example, executes a program. These functional configurations may be realized by a single program and may be realized by plural programs.

When the authentication count of authentication performed by the authenticating unit 305 using the user ID has reached a threshold value, the inquiring unit 308 inquires to the other image forming device 30 indicated by the spooler information stored in the distribution server device 10 so as to be correlated with the authentication count based on the authentication count recorded by the recording unit 306, about whether or not the authentication count of the other image forming device 30 corresponding to the user ID is equal to or larger than a first threshold value. In this case, the image forming device 30 having the inquiring unit 308 is used as a first image forming device. Moreover, the other image forming device 30 serving as an inquiry destination of the inquiring unit 308 is used as a second image forming device. Practically, the inquiring unit 308 specifies the other image forming device 30 serving as the inquiry destination based on the user information 41*a* stored in the storage unit 33. However, as described above, the same user ID and the same spooler information as the user information 41 stored in the distribution server device 10 are included in the user information 41*a*. Thus, it may be said that the inquiring unit 308 specifies the other image forming device 30 serving as the inquiry destination based on the user information 41 stored in the distribution server device 10.

The responding unit 309 responds as to whether or not the authentication count inquired by the inquiring unit 308 is equal to or larger than a second threshold value based on the authentication count recorded by the own device. The second threshold value may be equal to the first threshold value and may be smaller than the first threshold value. When there is a response from the responding unit 309, indicating that the authentication count is smaller than the second threshold value, the specifying unit 307 notifies the user ID and the spooler information similarly to the first exemplary embodiment described above. On the other hand, when there is a response from the responding unit 309, indicating that the authentication count is equal to or larger than the second threshold value, the specifying unit 307 does not notify the user ID and the spooler information.

FIG. 17 is a sequence chart showing an operation of updating the user information 41 according to the second exemplary embodiment. The image forming device 30 records the authentication count for each user ID similarly to the first exemplary embodiment described above. However, in the second exemplary embodiment, the image forming device 30 also measures the authentication count of the user ID which is correlated with the spooler information indicating the own device in the user information 41a. When the authentication count recorded in the recording information 43 has reached a threshold value, the image forming device 30 specifies the user ID and the own device corresponding to the authentication count similarly to steps S21 and S22 shown in FIG. 13 (steps S31 and S32). In this exemplary embodiment, it is assumed that the user ID "user001" and the image forming device 30B are specified in the image forming device 30B.

In this case, the image forming device 30B inquires to the other image forming devices 30 indicated by the spooler information correlated with the user ID "user001" in the user information 41a stored in the storage unit 33B about whether or not the authentication count of the other image forming devices 30 corresponding to the user ID has reached a threshold value (step S33). Specifically, as shown in FIG. 7, in the user information 41a, the primary spooler information "spoolerA" is correlated with the user ID "user001." In this case, the controller 31B controls the communication unit 32B to inquire to the image forming device 30A indicated by the primary spooler information about whether or not the authentication count of the image forming device 30A corresponding to the user ID "user001" has reached a threshold value.

The image forming device 30A responds as to whether the authentication count inquired from the image forming device 30B is equal to or larger than the threshold value based on the authentication count recorded in the recording information 43 (step S34). Specifically, the controller 31A determines whether or not the authentication count corresponding to the user ID "user001" in the recording information 43 stored in the storage unit 33A is equal to or larger than the threshold value. When the authentication count corresponding to the user ID "user001" is equal to or larger than the threshold value, the controller 31A controls the communication unit 32A to transmit response information to the image forming device 30B, indicating that the authentication count is equal to or larger than the threshold value. On the other hand, when the authentication count corresponding to the user ID "user001" is smaller than the threshold value, the controller 31A controls the communication unit 32A to transmit response information to the image forming device 30B, indicating that the authentication count is smaller than the threshold value.

When there is a response from the image forming device 30A, indicating that the authentication count corresponding to the user ID "user001" is smaller than the threshold value (step S35: "smaller than threshold value"), the image forming device 30B transmits update information including the user ID "user001" and the spooler information "spoolerB" of the own device to the distribution server device 10 similarly to step S23 shown in FIG. 13 (step S36). In this way, the spooler information "spoolerB" indicating the image forming device 30B and the user ID "user001" are notified to the distribution server device 10. Upon receiving update information from the image forming device 30B, the distribution server device 10 updates the user information 41 stored in the storage unit 14 similarly to step S24 shown in FIG. 13 (step S37).

On the other hand, when there is a response from the image forming device 30A, indicating that the authentication count corresponding to the user ID "user001" is equal to or larger than the threshold value (step S35: equal to or larger than threshold value), the image forming device 30B ends this process without transmitting the update information. That is, when there is a response from the image forming device 30A, indicating that the authentication count is equal to or larger than the threshold value, the image forming device 30B does not notify the spooler information and the user ID. In this case, the user information 41 is not updated in the distribution server device 10.

In the second exemplary embodiment, when the authentication count of the image forming device 30B corresponding to the user ID has reached the threshold value, and the authentication count of the image forming device 30A corresponding to the user ID is smaller than the threshold value, the user information 41 stored in the distribution server device 10 is updated and image data is stored in the image forming device 30B. In other words, in the second exemplary embodiment, even when the authentication count of the image forming device 30B corresponding to the user ID has reached the threshold value, if the authentication count of the image forming device 30A corresponding to the user ID is equal to or larger than the threshold value, the user information 41 stored in the distribution server device 10 is not updated. The authentication count is information indicating the use frequency of the image forming device 30. Thus, according to the second exemplary embodiment, the image data is stored in the image forming device based on the use frequency of the user. Moreover, in the second exemplary embodiment, similarly to the first exemplary embodiment described above, each image forming device 30 performs a process of determining whether or not the authentication count has reached a threshold value. Thus, the processing load is distributed more than a case where these processes are performed solely by the distribution server device 10.

Third Exemplary Embodiment

In a third exemplary embodiment, the operation of updating the user information 41 is different from that of the first exemplary embodiment. In the third exemplary embodiment, which image forming device 30 is frequently used by the user is determined on the distribution server device 10 side on a relative basis. Moreover, in the third exemplary embodiment, the image forming device 30 frequently used by the user is specified using log information 44 instead of the authentication count. The log information 44 is information indicating the history of processing in the image forming device 30. Since the other configurations and operations are the same as those of the first exemplary embodiment, description thereof will not be provided.

FIG. 18 is a diagram showing the functional configurations of the distribution server device 10 according to the third exemplary embodiment. A second acquiring unit 102, the specifying unit 307, and the updating unit 101 are realized by the CPU 11 executing a program. The functional configurations of the distribution server device 10 may be realized by a single program and may be realized by plural programs. For example, the second acquiring unit 102 may be realized by an application program different from a program realizing the other functional configuration.

The second acquiring unit 102 acquires the log information 44 recorded in each image forming device 30 from the image forming devices 30A, 30B, and 30C. In the log information 44, information indicating an image formation history of image formation performed by the image forming unit 35 is included. The log information 44 is an example of the use history of the user. The specifying unit 307 is provided in the distribution server device 10 instead of the image forming device 30. The specifying unit 307 calculates a print count corresponding to the image data corresponding to the user ID based on the log information 44 acquired by the second acquiring unit 102 and specifies a user ID and the image forming device 30 having the highest print count corresponding to the user ID among the image forming devices 30A, 30B, and 30C. The print count indicates the frequency of image formation performed by the image forming unit 35 based on the image data corresponding to the user ID. That is, the specifying unit 307 specifies the user ID and the image forming device 30 that satisfies a condition that the image forming device 30 has the highest frequency of image formation performed based on the image data corresponding to the user ID. The updating unit 101 updates the spooler information of the user information 41 stored in the storage unit 14 so that the spooler information indicating the image forming device 30 specified by the specifying unit 307 and the specified user ID are stored in a correlated manner.

FIG. 19 is a sequence chart showing the operation of updating the user information 41 according to the third exemplary embodiment. The image forming device 30 records the log information 44 for each user ID. Specifically, the controller 31 records the history of processing corresponding to each user ID in the log information 44. When the image forming device 30 has other functions such as a scanner or a facsimile in addition to the print function, the history of processing also includes the history of processing of a scanner or a facsimile as well as the history of printing. The log information 44 is stored in the storage unit 33.

FIG. 20 is a diagram showing an example of the log information 44. In the log information 44, a processing time, a user ID, and a processing type are stored in a correlated manner. The processing time is the time when processing is performed. The user ID is input by the user. The processing type is information indicating the type of processing. When the user ID "user001" is input and printing is performed, the controller 31 records the time "2011/9/1/11:30" when printing is performed, the user ID "user001," and the processing type "print" in the log information 44 in a correlated manner. In the following description, the processing history including the processing type "print" will be referred to as a "print log."

The distribution server device 10 acquires the log information 44 from each image forming device 30 at a predetermined time. Specifically, when a predetermined time comes, the CPU 11 controls the communication unit 13 to send a request for the log information 44 to the image forming devices 30A, 30B, and 30C (step S41 of FIG. 19). In response to this request, the image forming devices 30A, 30B, and 30C read the log information 44 from the storage units 33A, 33B, and 33C and transmit the log information 44 to the distribution server device 10 (step S42). Upon receiving the log information 44 from the image forming devices 30A, 30B, and 30C, the distribution server device 10 updates the user information 41 stored in the storage unit 14 based on the received log information 44 (step S43).

Figure 21:
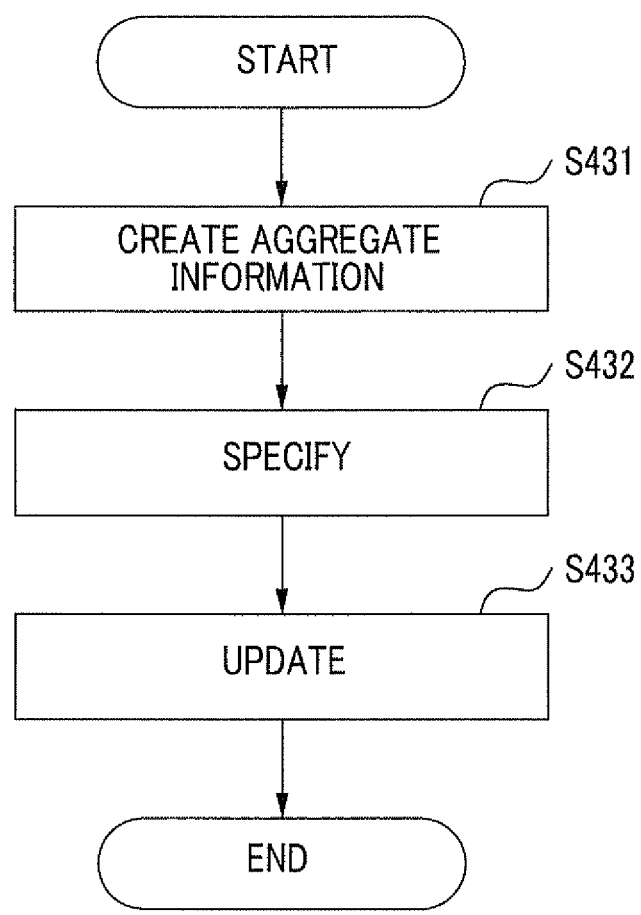
FIG. 21 is a flowchart showing an user information updating process.

FIG. 21 is a flowchart showing a process of updating the user information 41. The CPU 11 aggregates the log information 44 received from the image forming devices 30A, 30B, and 30C for each user ID to create aggregate information 45 (step S431). FIG. 22 is diagram showing an example of the aggregate information 45. In the aggregate information 45, a user ID and the print counts of the image forming devices 30A, 30B, and 30C are stored in a correlated manner. The user ID is included in the log information 44. The print count is calculated from the number of print logs included in the log information 44. For example, it is assumed that the log information 44 shown in FIG. 20 is received from the image forming device 30A. The log information 44 includes one print log corresponding to the user ID "user001." This means that printing corresponding to the user ID "user001" is performed once in the image forming device 30A. In this case, the CPU 11 adds "1" to the aggregate information 45 as the print count of the image forming device 30A corresponding to the user ID "user001." The CPU 11 calculates the print counts of the image forming devices 30B and 30C by the same method and adds the print counts to the aggregate information 45.

The CPU 11 specifies the user ID included in the aggregate information 45 and the image forming device 30 having the highest print count corresponding to the user ID among the image forming devices 30A, 30B, and 30C based on the created aggregate information 45 (step S432). In the aggregate information 45 shown in FIG. 22, the print count "1" of the image forming device 30A, the print count "5" of the image forming device 30B, and the print count "0" of the image forming device 30C are correlated with the user ID "user001." If so, the image forming device 30B has the highest print count corresponding to the user ID "user001" among the image forming devices 30A, 30B, and 30C. In this case, the CPU 11 specifies the user ID "user001" and the image forming device 30B. The CPU 11 performs this process with respect to all of the user IDs included in the aggregate information 45. Moreover, the CPU 11 updates the user information 41 stored in the storage unit 14 so that the spooler information indicated by the specified image forming device 30 and the specified user ID are stored in a correlated manner similarly to step S24 shown in FIG. 13 (step S433).

In the third exemplary embodiment, the image data corresponding to the user ID are stored in the image forming device 30 having the highest print count corresponding to the user ID among the image forming devices 30A, 30B, and 30C. The print count is information indicating the use frequency of the image forming device 30. Thus, according to the third exemplary embodiment, image data is stored in the image forming device based on the use frequency of the user. Moreover, in the third exemplary embodiment, the print log is used instead of the authentication count. Therefore, the image data corresponding to a user ID are stored in the image forming device 30 having the highest frequency of printing corresponding to the user ID.

Modification Examples

The present invention is not limited to the above-described exemplary embodiments but may be modified in the following ways. Moreover, the following modification examples may be combined with each other.

(1) Modification Example 1

In the first or second exemplary embodiment described above, the image forming device 30 may determine whether or not the print count corresponding to the user ID has reached a threshold value using the print log instead of the authentication count. In this case, the image forming device 30 records the log information 44 for each user ID as described in the third exemplary embodiment. Moreover, the image forming device 30 aggregates the log information 44 for each user ID to create the aggregate information 45 similarly to step S431 shown in FIG. 21. When the print count included in the aggregate information 45 exceeds a threshold value, the image forming device 30 proceeds to the next step.

When the image forming device 30 has plural functions such as a scanner or a facsimile in addition to the print function, the user may use the image forming device 30 in order to perform processing other than the printing. If so, the image forming device 30 having the high authentication count is not necessarily always the image forming device 30 having the highest use frequency, used when the user performs printing. In Modification Example 1, the print log is used instead of the authentication count. Thus, according to Modification Example 1, image data corresponding to the user ID are stored in the image forming device 30 having the highest printing frequency corresponding to the user ID.

(2) Modification Example 2

In the third exemplary embodiment described above, the distribution server device 10 may specify the image forming device 30 having the highest authentication count using the authentication count instead of the print log. In this case, the image forming device 30 records the authentication history for each user ID. The distribution server device 10 acquires the authentication history from the image forming devices 30A, 30B, and 30C in steps S41 and S42 shown in FIG. 19. In step S43 shown in FIG. 19, the distribution server device 10 calculates the authentication count of authentication count performed using the user ID in each image forming device 30 based on the authentication history acquired from the image forming devices 30A, 30B, and 30C and specifies the user ID and the image forming device 30 having the highest authentication count corresponding to the user ID among the image forming devices 30A, 30B, and 30C. Moreover, the distribution server device 10 updates the user information 41 stored in the storage unit 14 based on the specified image forming device 30 and the specified user ID similarly to step S433 shown in FIG. 21. In Modification example 2, since the log information 44 is not used, the image forming device 30 does not need to record the log information 44.

(3) Modification Example 3

The function of the distribution server device 10 may be performed by any of the image forming devices 30 instead of the distribution server device 10. The image forming device 30 performs the function of the distribution server device 10 is determined in advance. In the following description, the image forming device 30 will be referred to as a "master device." In this case, the user information 41 is stored in the storage unit 33 of the master device similarly to the distribution server device 10. The master device performs the operation of updating and distributing the user information and updating the printer driver similarly to the distribution server device 10. For example, when performing the user information updating operation according to the third exemplary embodiment, the master device acquires the log information 44 from the other image forming devices 30. Moreover, the master device specifies the image forming device 30 having the highest print count among the image forming devices 30A, 30B, and 30C based on the log information 44 stored in the storage unit 33 and the log information 44 acquired from the other image forming devices 30.

The master device may be provided in each sub-network. In this case, when distributing the user information 41a to the other image forming devices 30, the master device may distribute the user information 41a to only the other image forming devices 30 provided in the same sub-network. Moreover, the master device may be changed dynamically. For example, a priority order concerning the master device is set in each image forming device 30. In general, the image forming device 30 having the highest priority order becomes the master device. However, for example, in a state where it is not possible to use the image forming device 30 having the highest priority order such as when power is turned off, the image forming device 30 having the next highest priority order becomes the master device. The states of the image forming devices 30 are checked by periodically transmitting the echo request described above to each other, for example.

(4) Modification Example 4

The user authentication process has been performed in the image forming device 30. However, the user authentication process may be performed on the distribution server device 10 side. In this case, the image forming device 30 sends a request for the user authentication process to the distribution server device 10. Specifically, the controller 31 controls the communication unit 32 to transmit the user ID input by the user to the distribution server device 10. In response to the request from the image forming device 30, the distribution server device 10 performs the same process as step S132 shown in FIG. 11 and responds as to whether or not authentication is successful. When there is a response from the distribution server device 10, indicating that authentication has failed, the image forming device 30 proceeds to step S133 shown in FIG. 11. On the other hand, when there is a response from the distribution server device 10, indicating that authentication was successful, the image forming device 30 proceeds to step S14 shown in FIG. 10.

Similarly to Modification example 3 described above, when the master device performs the function of the distribution server device 10, the user authentication process may be performed on the master device side. In this case, the image forming device 30 other than the master device sends a request for the user authentication process to the master device. In response to the request, the master device performs the user authentication process and responds as to whether or not authentication is successful.

(5) Modification Example 5

When image data is transmitted from the client device 20, there may be a case where it is not possible to use the image forming device 30 indicated by the primary spooler information and the image forming device 30 indicated by the secondary spooler information. In this case, the client device 20 may acquire spooler information other than the primary spooler information and the secondary spooler information corresponding to the user ID set in the printer driver 42 from the distribution server device 10 and transmit image data to the image forming device 30 indicated by the spooler information.

(6) Modification Example 6

In the user information 41 shown in FIG. 3, up to three spooler information are correlated with the user ID. However, when there are a larger number of image forming devices 30, a larger number of spooler information may be correlated with the user ID. In this case, in the image data retrieval operation described above, the image forming device 30 may acquire a predetermined number (for example, five) of spooler information selected based on the priority order among the spooler information other than the primary spooler information and the secondary spooler information from the distribution server device 10.

(7) Modification Example 7

In the user information 41*a* stored in the image forming device 30, the primary spooler information and the secondary spooler information are included. However, the number of spooler information included in the user information 41*a* is not limited to 2. For example, only one spooler information may be included, and three spooler information or more may be included. The number of spooler information included in the user information 41*a* is determined in advance. That is, a predetermined number of spooler information selected based on the priority order are included in the user information 41*a*. Alternatively, all of the spooler information in the user information 41 stored in the distribution server device 10 so as to be correlated with the user ID may be included in the user information 41*a*.

(8) Modification Example 8

In the user information distributing operation, only a difference from the user information 41*a* distributed previously may be distributed. In this case, the image forming device 30 updates only the user information 41*a* corresponding to the difference received from the distribution server device 10.

(9) Modification Example 9

The user ID described above is an example of the user information for identifying the user. The user information is not limited to the user ID. For example, the user information may be a card ID allocated to an IC card provided to the user and may be a mail address allocated to the user. Moreover, as described above, since the IC card is provided every user, the card ID allocated to the IC card may be used as the user information.

(10) Modification Example 10

The user authentication process may be performed without using the IC card. For example, the user may input the user ID thereof using the UI unit 34 of the image forming device 30. In this case, the UI unit 34 is used as the receiving unit that receives the user information input by the user. Moreover, biological information such as a fingerprint may be used instead of the user ID. In this case, a device for reading the biological information is provided in the image forming device 30. In this case, this device is used as the receiving unit that receives the user information input by the user.

(11) Modification Example 11

The user authentication process may be performed using a user ID and a password. In this case, the user ID and the password are stored in the user information 41 in a correlated manner. When performing the authentication process, the user input the password using the UI unit 34, for example.

(12) Modification Example 12

In the print operation described above, after the image data list 50 is displayed, image data selected by the user are acquired. However, it is not always necessary to display the image data list 50. For example, after the authentication process of step S13 shown in FIG. 10, the image data may be acquired without acquiring the attribute information. In this case, the image forming device 30 sends a request for the image data corresponding to the user ID to the image forming devices 30 indicated by the primary spooler information and the secondary spooler information stored in the user information 41*a* so as to be correlated with the input user ID. In this case, the user does not need to select the image data.

(13) Modification Example 13

The configuration of the image forming system 1 is not limited to the configuration shown in FIG. 1. For example, the number of image forming devices 30 may be increased in accordance with the number of users. Moreover, a number of client devices 20 may be provided so as to correspond to the number of users.

(14) Modification Example 14

The image forming unit 35 may be a printer that forms an image by a method other than the electrophotographic method. Moreover, the image forming unit 35 may be one which forms a monochrome image and may be one which forms a color image. Although the UI unit 34 includes a touch panel used as a display, the UI unit 34 may include a display device such as a liquid crystal display instead of the touch panel.

(15) Modification Example 15

The program executed by the CPU 11, the CPU 21, or the CPU of the controller 31 may be provided in a state of being recorded in a recording medium such as a magnetic tape, a magnetic disk, a flexible disk, an optical disc, an opto-magnetic disc, or a memory and may be installed in the distribution server device 10, the client device 20, or the image forming device 30. Moreover, the program may be downloaded to the distribution server device 10, the client device 20, or the image forming device 30 via a communication line such as the Internet.

The foregoing description of the exemplary embodiments of the present invention has been provided for the purposes of illustration and description. It is not intended to be exhaustive or to limit the present invention to the precise forms disclosed. Obviously, many modifications and variations will be apparent to practitioners skilled in the art. The exemplary embodiments were chosen and described in order to best explain the principles of the present invention and its practical applications, thereby enabling others skilled in the art to understand the present invention for various exemplary embodiments and with the various modifications as are suited to the particular use contemplated. It is intended that the scope of the present invention be defined by the following claims and their equivalents.

What is claimed is:

1. An image forming system comprising:
   a plurality of image forming devices;
   a first storage unit that stores, in a correlated manner, (1) user information for identifying a user and (2) device information indicating, of the plurality of image forming devices, a correlated image forming device to which image date of the user is to be stored;
   a transmitting device that transmits the image data to the correlated image forming device;

a second storage unit that is provided in each of the image forming devices and that is configured to store the image data transmitted from the transmitting device;

a receiving unit that is provided in each of the image forming devices and that is configured to receive an input of the user information;

a first acquiring unit that is provided in each of the image forming devices and that is configured to acquire, from the correlated image forming device, the image data of the user;

an image forming unit that is provided in each of the image forming devices and that is configured to form an image corresponding to the image data acquired by the first acquiring unit;

a recording unit that is provided in each of the image forming devices and that records a usage count of an image forming device of the plurality of image forming devices that receives the input of the user information;

a specifying unit that specifies, of the plurality of image forming devices, an image forming device other than the correlated image forming device and of which the usage count satisfies a condition; and an updating unit that updates the device information stored in the first storage unit so that the image forming device specified by the specifying unit and the user information are stored in a correlated manner, wherein after the updating unit has updated the device information, the transmitting device transmits image data corresponding to the user information to the image forming device specified by the specifying unit, and wherein after the updating unit has updated the device information, the first acquiring unit acquires the image data corresponding to the user information from the image forming device specified by the specifying unit.

2. The image forming system according to claim 1, wherein the specifying unit (1) is provided in each of the plurality of image forming devices, (2) specifies an own device when the usage count of the own device reaches a first threshold value, and (3) notifies the updating unit of the specified own device, and wherein the updating unit updates the device information stored in the first storage unit so that the specified own device and the user information are stored in a correlated manner.

3. The image forming system according to claim 2, wherein the image forming device receiving the input of the user information includes an inquiry unit that inquires to the correlated image forming device when the usage count of the image forming device receiving the input of the user information reaches a first threshold value, wherein the correlated image forming device includes a responding unit that responds whether or not the usage count of the correlated image forming device is smaller than a second threshold value different than the first threshold value, and wherein the specifying unit specifies the image forming device receiving the input of the user information when the responding unit indicates that the usage count of the correlated image forming device is smaller than the second threshold value.

4. The image forming system according to claim 2, further comprising:

an authenticating unit that performs authentication of the user using the input user information, wherein the recording unit records an authentication history of the authentication performed by the authenticating unit for each of the input user information, and wherein the specifying unit calculates frequency of the authentication performed by the authenticating unit based on the authentication history recorded by the recording unit and specifies the image forming device specified by the specifying unit based on the calculated frequency.

5. The image forming system according to claim 2, wherein the recording unit records an image formation history of image formation performed by the image forming unit for each of the input user information, and wherein the specifying unit calculates frequency of the image formation performed by the image forming unit based on the image formation history recorded by the recording unit and specifies the image forming device specified by the specifying unit based on the calculated frequency.

6. The image forming system according to claim 3, wherein the specifying unit does not specify the image forming device receiving the input of the user information when there is a response, from the responding unit, indicating that the usage count of the correlated image forming device is equal to or larger than the second threshold value.

7. The image forming system according to claim 3, further comprising:

an authenticating unit that performs authentication of the user using the input user information, wherein the recording unit records an authentication history of the authentication performed by the authenticating unit for each of the input user information, and wherein the specifying unit calculates frequency of the authentication performed by the authenticating unit based on the authentication history recorded by the recording unit and specifies the image forming device specified by the specifying unit based on the calculated frequency.

8. The image forming system according to claim 3, wherein the recording unit records an image formation history of image formation performed by the image forming unit for each of the input user information, and wherein the specifying unit calculates frequency of the image formation performed by the image forming unit based on the image formation history recorded by the recording unit and specifies the image forming device specified by the specifying unit based on the calculated frequency.

9. The image forming system according to claim 6, further comprising:

an authenticating unit that performs authentication of the user using the input user information, wherein the recording unit records an authentication history of the authentication performed by the authenticating unit for each of the input user information, and wherein the specifying unit calculates frequency of the authentication performed by the authenticating unit based on the authentication history recorded by the recording unit and specifies the image forming device specified by the specifying unit based on the calculated frequency.

10. The image forming system according to claim 1, further comprising:

a second acquiring unit that acquires the usage counts of the plurality of image forming devices, wherein the specifying unit specifies the image forming device of the plurality of image forming devices having the highest usage count.

11. The image forming system according to claim 10, further comprising:
an authenticating unit that performs authentication of the user using the input user information,
wherein the recording unit records an authentication history of the authentication performed by the authenticating unit for each of the input user information, and
wherein the specifying unit calculates frequency of the authentication performed by the authenticating unit based on the authentication history recorded by the recording unit and specifies the image forming device specified by the specifying unit based on the calculated frequency.

12. The image forming system according to claim 1, further comprising:
an authenticating unit that performs authentication of the user using the input user information,
wherein the recording unit records an authentication history of the authentication performed by the authenticating unit for each of the input user information, and
wherein the specifying unit calculates frequency of the authentication performed by the authenticating unit based on the authentication history recorded by the recording unit and specifies the image forming device specified by the specifying unit based on the calculated frequency.

13. The image forming system according to claim 1,
wherein the recording unit records an image formation history of image formation performed by the image forming unit for each of the input user information, and
wherein the specifying unit calculates frequency of the image formation performed by the image forming unit based on the image formation history recorded by the recording unit and specifies the image forming device specified by the specifying unit based on the calculated frequency.

14. The image forming system according to claim 1,
wherein the device information stored in the first storage unit is created before the user instructs printing of any print job and indicates, of the plurality of image forming devices, two or more image forming devices to which image data of the user is to be preferentially stored, and
wherein the transmitting device transmits the image data to a correlated image forming device that has the highest priority order among the image forming devices indicated by the device information.

15. The image forming system according to claim 14,
wherein attribute information for identifying the image data is appended to the image data, and
wherein each of the plurality of image forming devices includes:
a third acquiring unit that acquires the attribute information appended to the image data from a predetermined number of image forming devices selected based on a priority order indicated by the first device information stored in the first storage unit, and
a display controller that controls to display the attribute information acquired by the third acquiring unit on a display,
wherein the first acquiring unit acquires image data selected based on the attribute information displayed on the display, and
wherein the third acquiring unit acquires attribute information appended to another image data from an image forming device of the plurality of image forming devices indicated by another device information other than the first device information when instructed to acquire attribute information appended to another image data corresponding to the input user information.

16. An image forming device comprising:
a second storage unit that stores image data of a user when the image data is transmitted to an own device from a transmitting device, the image data corresponding to user information for identifying a user that is stored in a first storage device and that is correlated with device information indicating, of a plurality of image forming devices, a correlated image forming device different than the own device to which the image data of the user is to be stored;
a receiving unit that is configured to receive an input of the user information;
an acquiring unit that is configured to acquire, from the correlated image forming device, the image data of the user;
an image forming unit that is configured to form an image corresponding to the image data acquired by the acquiring unit;
a recording unit that records a usage count of the own device corresponding to the input user information; and
a specifying unit that specifies the own device when the usage count of the own device has reached a first threshold value, and notifies an updating unit of the specified own device, the updating unit updating the device information stored in the first storage unit,
wherein after the updating unit has updated the device information, the transmitting device transmits image data corresponding to the user information to the own device, and
wherein after the updating unit has updated the device information, the first acquiring unit acquires the image data corresponding to the user information from the own device.

17. An image forming device comprising:
a first storage unit that stores, in a correlated manner, (1) user information for identifying a user and (2) device information indicating, of a plurality of image forming devices, a correlated image forming device to which image data of the user is to be stored;
a second storage unit that stores the image data when the image data is transmitted from a transmitting device to the own device;
a receiving unit that is configured to receive the input of the user information;
a first acquiring unit that is configured to acquire, from the correlated image forming device, the image data of the user;
an image forming unit that is configured to form an image corresponding to the image data acquired by the first acquiring unit;
a recording unit that records a usage count of the own device corresponding to the input user information;
a second acquiring unit that acquires the usage count recorded in other image forming devices of the plurality of image forming devices from the other image forming devices;
a specifying unit that specifies the image forming device having the highest usage count among the own device and the other image forming devices based on the usage count recorded by the recording unit and the usage count acquired by the second acquiring unit; and an updating unit that updates the device information stored in the first storage unit so that the image forming device specified by the specifying unit and the user information are stored in a correlated manner, wherein after the updating unit has updated the device information, the transmitting device transmits image data corresponding to the user information to the image forming device specified by the specifying unit, wherein after the updating unit has updated the device information, the first acquiring unit acquires the image data corresponding to the user information from the image forming device specified by the specifying unit, and wherein the image forming device specified by the specifying unit is other than the correlated image forming device.

18. A non-transitory computer readable medium storing a program for causing a computer to execute a process, the process comprising:

storing image data of a user in a second storage unit when the image data is transmitted to a corresponding image forming device from a transmitting device, the image data corresponding to user information for identifying a user that is stored in a first storage unit and that is correlated with device information indicating, of a plurality of image forming devices, a correlated image forming device different than the corresponding image forming device to which the image data of the user is to be stored;

when a receiving unit receives an input of the user information, acquiring the image data of the user from the correlated image forming device;

forming an image corresponding to the acquired image data;

recording a usage count of the corresponding image forming device corresponding to the input user information; and specifying the corresponding image forming device when the usage count of the corresponding device has reached a threshold value, and notifying an updating unit of the specified corresponding image forming device, the updating unit updating the device information stored in the first storage unit, wherein after the updating unit has updated the device information, the transmitting device transmits image data corresponding to the user information to the corresponding image forming device, and wherein after the updating unit has updated the device information, the acquiring acquires the image data corresponding to the user information from the corresponding image forming device.

19. A non-transitory computer readable medium storing a program for causing a computer including a first storage unit that stores, in a correlated manner, (1) user information for identifying a user and (2) device information indicating, of a plurality of image forming devices, a correlated image forming device to which image data of the user is to be stored to execute a process, the process comprising:

storing the image data in a second storage unit when the image data is transmitted from a transmitting device to a corresponding image forming device;

when a receiving unit receives the input of the user information, acquiring the image data of the user from the correlated image forming device;

forming an image corresponding to the acquired image data;

recording a usage count of the corresponding image forming device corresponding to the input user information;

acquiring the usage count recorded in other image forming devices of the plurality of image forming devices from the other image forming devices;

specifying the image forming device having the highest usage count among the corresponding image forming device and the other image forming devices based on the recorded usage count and the acquired usage count; and updating the device information stored in the first storage unit so that the specified image forming device and the user information are stored in a correlated manner, wherein after the updating has updated the device information, the transmitting device transmits image data corresponding to the user information to the specified image forming device, wherein after the updating has updated the device information, the acquiring acquires the image data corresponding to the user information from the specified image forming device, and wherein the image forming device specified by the specifying unit is other than the correlated image forming device.

* * * * *